United States Patent [19]

Umebayashi

[11] Patent Number: 4,629,828
[45] Date of Patent: * Dec. 16, 1986

[54] SIGNAL TRANSMISSION APPARATUS FOR STEERING OPERATION BOARD

[75] Inventor: Kazuyuki Umebayashi, Tokyo, Japan

[73] Assignee: Aisin Seiki Kabushikikaisha, Japan

[*] Notice: The portion of the term of this patent subsequent to Jun. 19, 2001 has been disclaimed.

[21] Appl. No.: 522,757

[22] Filed: Aug. 12, 1983

[30] Foreign Application Priority Data

Aug. 17, 1982 [JP] Japan .................................. 57-142535

[51] Int. Cl.$^4$ ............................................. H04M 1/23
[52] U.S. Cl. ........................................ 379/56; 455/89; 379/63; 381/92
[58] Field of Search .............................. 179/2 E-2 EC, 179/5.5; 455/89, 90, 603, 602, 613, 614, 606-608; 340/22; 180/78; 381/86, 92

[56] References Cited

U.S. PATENT DOCUMENTS 4,455,454 6/1984 Umebayashi ..................... 455/89 X
4,456,903 6/1984 Kishi et al. ...................... 455/613 X

FOREIGN PATENT DOCUMENTS 0116396 9/1981 Japan ..................................... 381/92
0069144 4/1983 Japan ..................................... 455/613

Primary Examiner—Robert G. Lev
Attorney, Agent, or Firm—Sughrue, Mion, Zinn, Macpeak, and Seas

[57] ABSTRACT

Microphones and key switches are provided on an operation board mounted on a steering wheel, and an audio signal as well as a control signal generated therefrom are sent to a road-vehicle stationary unit through a light transmission means including plural pairs of light emitting and receiving elements, thereby to supply the audio signal to be transmitted and to make sending/receiving control for a radio communication apparatus incorporated in the road-vehicle stationary unit. The operation board is mounted in a floating relation with respect to the steering wheel and an optical path of the light transmission means is formed in plural number, so that all these optical paths are not interrupted by spokes for supporting the steering wheel simultaneously at the least.

12 Claims, 24 Drawing Figures

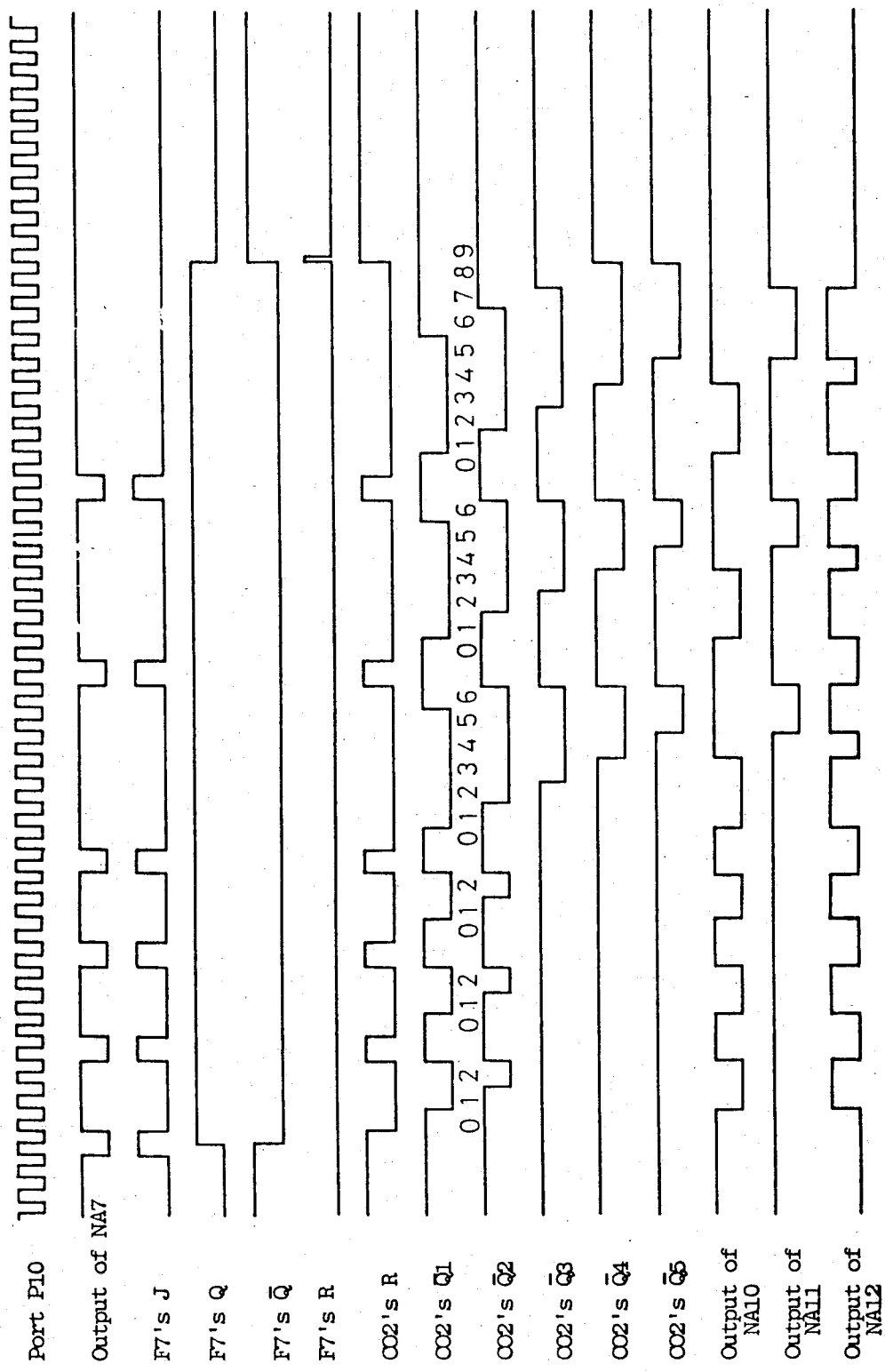

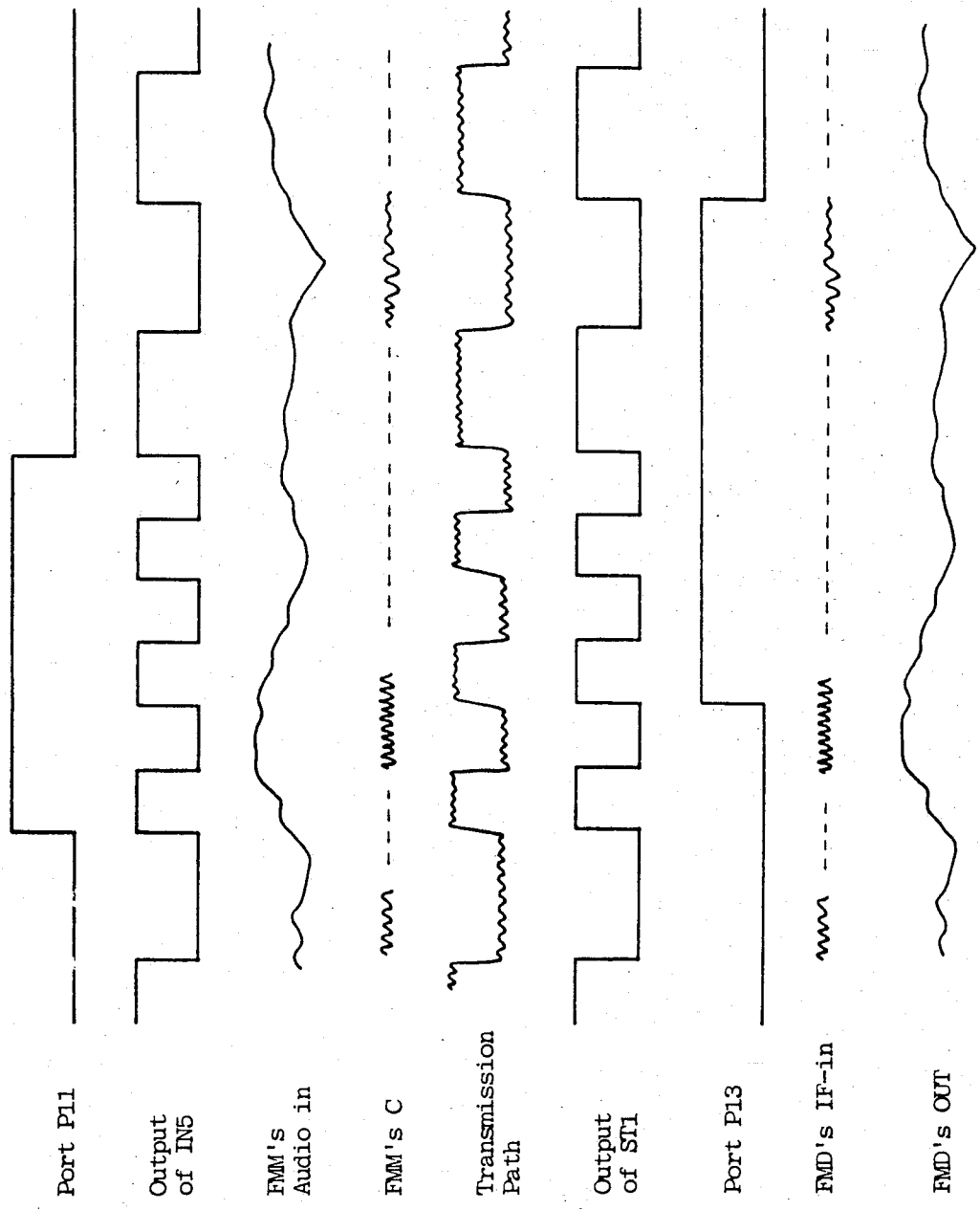

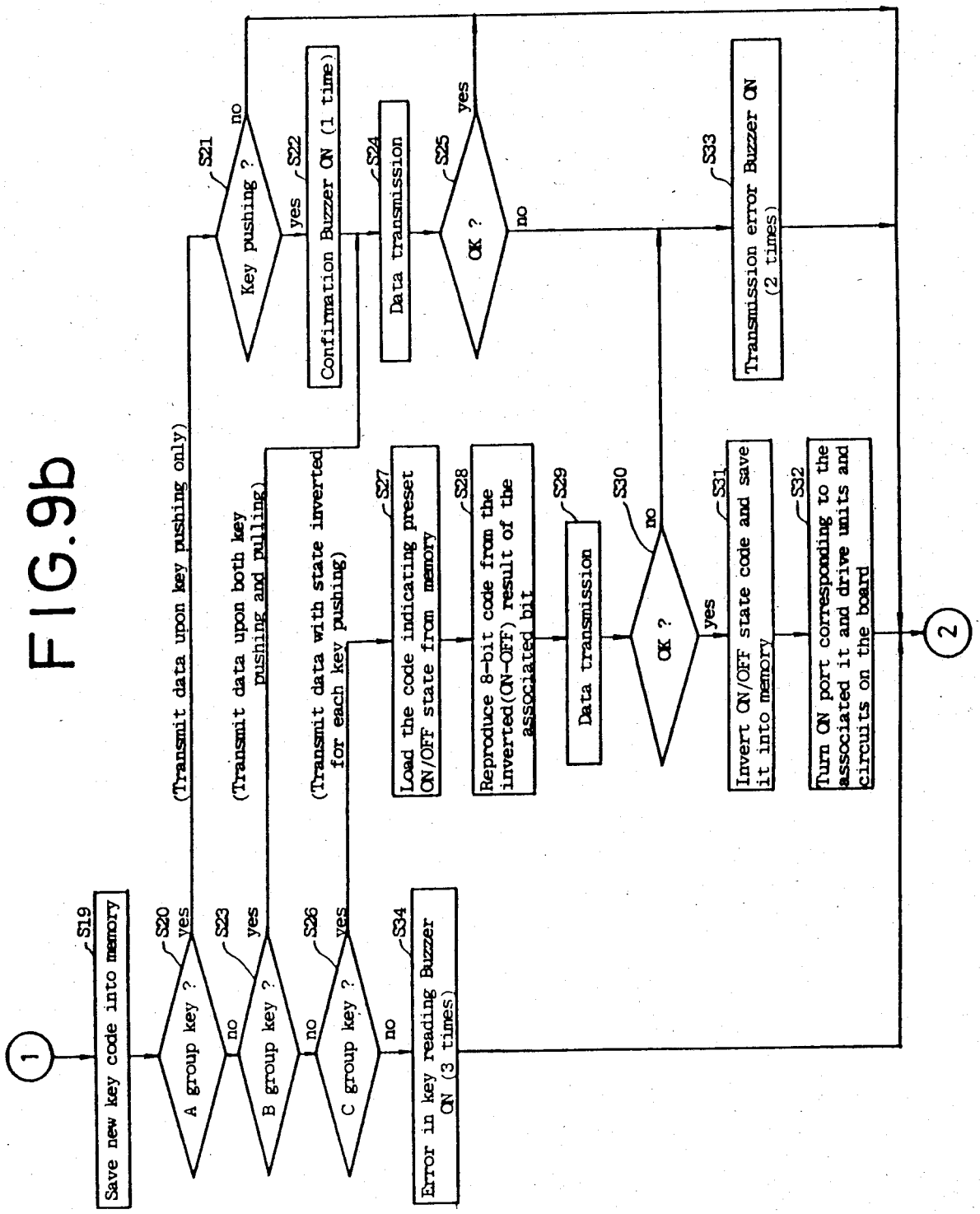

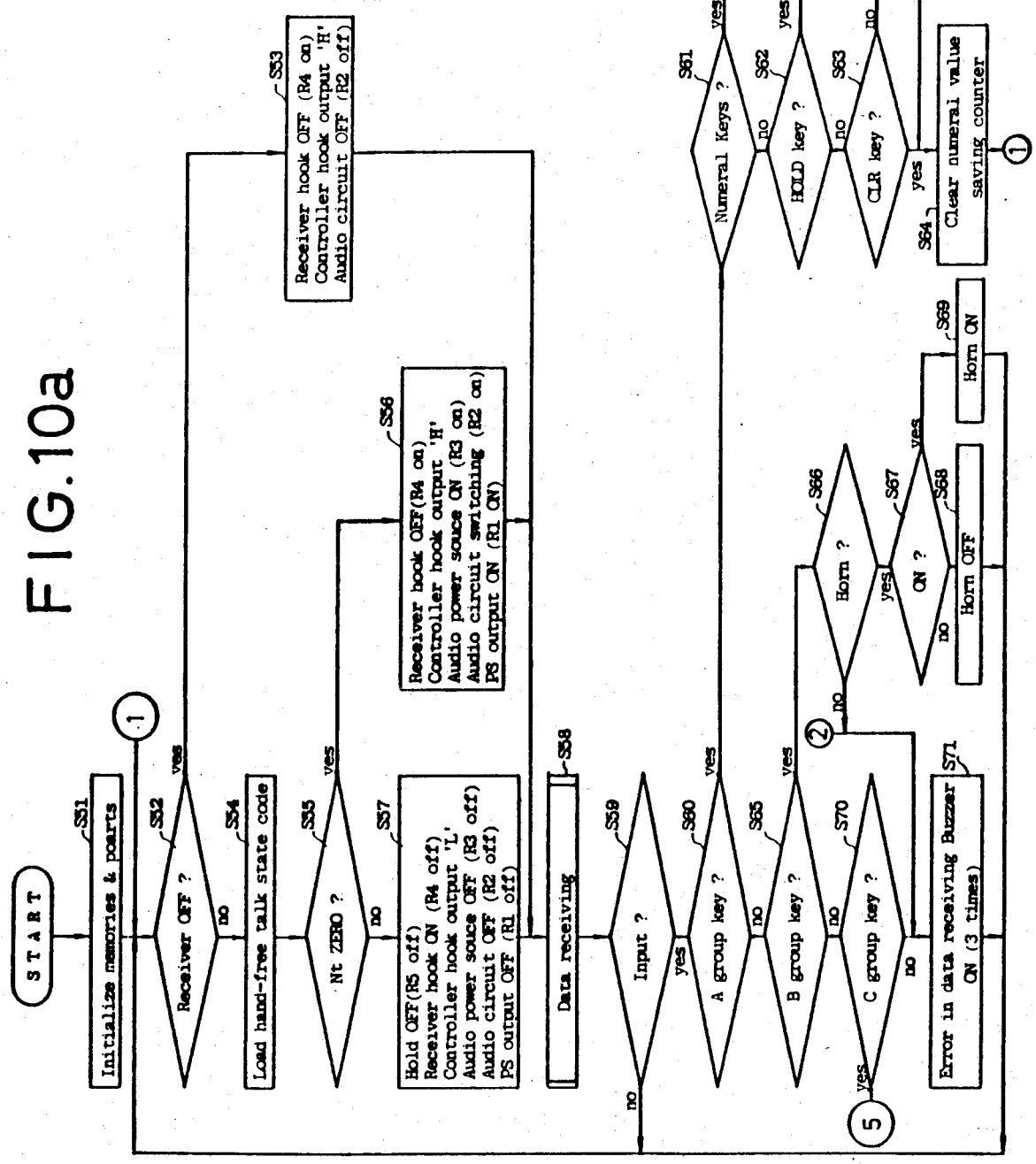

SIGNAL TRANSMISSION APPARATUS FOR STEERING OPERATION BOARD

BACKGROUND OF THE INVENTION

This invention relates to a signal transmission apparatus for a steering operation board adapted to transmit signals between a control unit on the vehicle body and the steering operation board in the vicinity of a steering wheel, and more particularly to a signal transmission apparatus for a steering operation board which includes an acoustic-electric converter such as a microphone on the steering operation board.

In vehicles, since a steering wheel is positioned nearest to the driver, particularly to his hands, an operation board equipped with a variety of keys, switches or the like adapted to control and command road-vehicle apparatus and units is preferably mounted at the central portion of the steering wheel for the purpose of improving operability.

However, a steering mechanism adapted to transmit a rotational movement of the wheel to a steering shaft is complicated, so that it is difficult to wire signal cables for connecting the operation board mounted at the center of the steering wheel (i.e, steering operation board) to a stationary control unit. To facilitate such wiring work, pipes for wiring and/or slip rings for connection must be additionally mounted to the steering mechanism and arranged in a manner without intervening operation thereof. Further, a mounting space allocated to the steering mechanism is limited practically, such wiring work will encounter much difficulty.

In view of the above, the applicant of this patent application has previously proposed in improved system (U.S. patent application Ser. No. 399,582 filed on July 19, 1982) wherein the operation board is connected to the stationary control unit using slip rings and brushes, thereby to transmit electric power and signals through such connection lines. With this, it is possible to supply the operation board with source power and to transmit much information generated therefrom without a need of using numerous lines.

In such system, however, it is difficult to ensure satisfactory reliability for a long term by reason of using mechanical elements such as a slip ring and brush. For example, if the contact surface between the slip ring and the brush is oxidized or a pressing force exerted on the contact portions is lowered with the lapse of time, the circuit may be disconnected temporarily due to mechanical vibrations or so travelled from the outside. Transmission of electric power can be prevented from suffering an influence due to disconnection of the power supply circuit by, for example, employing a capacitor of relatively large capacity. As to transmission of signals, however, there is a fear of danger such that the received information includes an error and the stationary control unit may be malfunctioned.

In order to eliminate such adverse influence, a system utilizing light beams for transmission of signals has been also proposed. But in this system, since the relative position between an optical element (e.g., light emitting element) on the steering wheel and another optical element (e.g., light receiving element) on the stationary vehicle body side is changed upon rotation of the steering wheel at the time of steering, transmission of signals is interrupted temporarily.

To avoid such inconvenience, there has been further proposed an improved system wherein a number of light emitting elements are disposed annularly at the central portion of the steering wheel and a single light receiving element is disposed in a position facing them, so that a light beam from any one of those light emitting elements may always reach the light receiving element. However, in case the operation board is arranged on the steering wheel in a floating relation in this system, by reason of spokes for supporting the steering wheel being positioned between the light emitting and receiving elements, an optical path between both elements is interrupted by the spokes upon rotation of the steering wheel. Also, because a number of light emitting elements are required, such system is disadvantageous and not suitable for practical use in terms of cost and power consumption.

When a radio communication apparatus is equipped on the vehicle, the apparatus is necessarily disposed in a position fairly spaced from a speaking person, e.g., the driver. To prevent transmission of external noises, therefore, it is usually arranged that a mouthpiece such as a microphone is made separatable from the communication apparatus body, the mouthpiece is connected to the apparatus body through a cord, and when communicating, the mouthpiece is taken off the apparatus body to come near the mouth of the speaking person. But, when the driver attempts to talk, he must have the mouthpiece such as a microphone by one hand, so that the driver has to drive the car by the remaining one hand in such occasion, resulting in a fear of danger. Since the driver has the most frequent opportunity to make communication, it is preferable to make it possible for the driver to make communication safely.

SUMMARY OF THE INVENTION

The first object of this invention is to provide a signal transmission apparatus for a steering operation board which allows the driver to communicate with the outside by himself safely while driving the vehicle.

The second object of this invention is to transmit voices of the driver to the communication apparatus free of noises with fidelity.

The third object of this invention is to prevent the steering wheel portion from being complicated in its construction and enlarged in its capacity.

To achieve the above objects, this invention is so arranged that an acoustic-electric converter such as a microphone and a switch means are incorporated in an operation board mounted on a steering wheel, both a signal modulated by the signal from the acoustic-electric converter and a signal modulated in accordance with operation of the switch means are transmitted to a control unit inclusive of a demodulator mounted on the vehicle body via a transmission means including light emitting and receiving means optically coupled with each other, and an electric signal or an audio signal generated from the acoustic-electric converter is applied to the road-vehicle radio communication apparatus in accordance with the predetermined operation of the switch means.

With this arrangement, the driver is able to communicate with the outside through the radio communication apparatus without a need of having the microphone or the like by his hand, so that he may safely talk with the other party even while driving the vehicle with his both hands holding the steering wheel. Since the steering wheel is positioned near the driver, it is possible to exclude all sounds other than voices generated by the driver, i.e., noises, and to input only voices of the driver to the communication apparatus by using a microphone with relatively high directivity in its sensitivity.

According to one preferred embodiment of this invention, the light emitting and receiving means are provided in plural pairs and positioned such that all of them do not enter in the projected areas of spokes simultaneously, whereby an optical path between at least one pair of light emitting and receiving means will never be interrupted by a rotational movement of the spokes of the steering wheel. More specifically, it is arranged that the operation board is mounted on the steering wheel in a floating relation to hold the former unchanged in its position even with rotation of the steering wheel, or the operation board is connected to the steering wheel through reduction gears to keep the former motionless substantially, and that each pair of the light emitting and receiving means are optically coupled with each other at all times. With this, even if an optical path between any one pair of light emitting and receiving means is interrupted by a movement of the spokes supporting the steering wheel when it is operated, an optical path between at least one another pair of light emitting and receiving means will not be interrupted.

For the purpose of confirmation of signal receipt processing as well as control of state display on the steering wheel operation board, it is preferable to transmit certain signals from the control unit on the vehicle body side to the operation board on the steering wheel. According to a preferred embodiment, therefore, a demodulation circuit and a modulation circuit are respectively incorporated in the steering operation board and the control unit on the vehicle body side, thereby to transmit certain information to the steering operation board from the vehicle body side. By so doing, it becomes possible to transmit information with high reliability and to display the desired data such as a speed of the vehicle and the number of revolutions of an engine on the steering wheel operation board.

BRIEF DESCRIPTION OF THE DRAWINGS

FIG. 2b is a front view showing the steering wheel in FIG. 2a;

FIG. 2c is a side sectional view showing a mounting structure of the steering wheel and the associated parts in FIG. 2a;

FIGS. 5a, 5b and 5c are timing charts showing the operation of FSK demodulation circuits 110 and 160 in FIG. 1;

FIG. 6 is a view showing schematic wave forms of signals at the respective parts of the apparatus shown in FIG. 1;

FIGS. 9a and 9b are flow charts showing the operation of a microcomputer 80 in FIG. 1;

FIGS. 10a, 10b and 10c are flow charts showing the operation of a microcomputer 130 in FIG. 1;

DESCRIPTION OF PREFERRED EMBODIMENT

Figure 1:
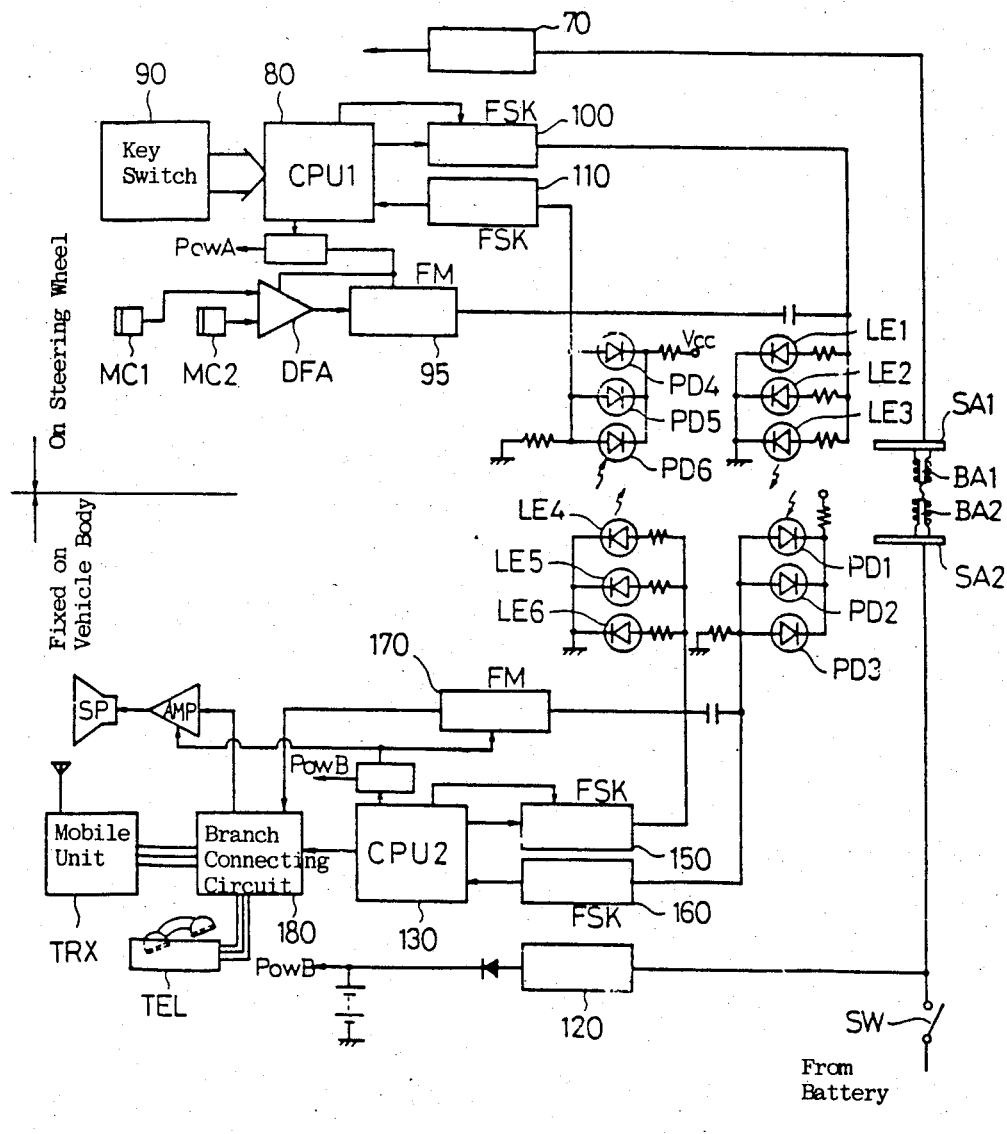
FIG. 1 is a schematic block diagram of a signal transmission apparatus for a steering operation board according to one embodiment of this invention.

In the following, one embodiment of this invention will be described in detail with reference to the accompanying drawings. The description will be made by referring to FIG. 1 where there is shown a schematic construction of one embodiment of this invention. In the illustrated embodiment, an operation board on a steering wheel comprises a constant-voltage power supply unit 70, a microcomputer unit 80 serving as a sending control device, a key switch 90, a first modulation means or FM modulation circuit 95, a second modulation means or FSK modulation circuit 100, and FSK demodulation circuit 110, a first acoustic-electric conversion means such as microphones MC1 and MC2, a differential amplifier DFA and a relay RL1.

These microphones MC1 and MC2 are disposed with a certain spacing therebetween directing in the same direction (i.e., toward the mouth of the driver), and their output terminals are respectively connected to the different input terminals of the differential amplifier DFA. With this, the DFA amplifies the difference level between a sound applied to the microphone MC1 and a sound applied to the microphone MC2, so that there can be obtained a larger output signal for sounds propagating in the arranging direction of MC1 and MC2, i.e., from the driver. In other words, noises coming from both sides are offset with each other, whereby only the signal corresponding to voices of the driver is largely amplified and then applied to the FM modulation circuit 95.

Also in the illustrated embodiment, a control unit on the vehicle body side comprises a constant-voltage power supply unit 120, a microcomputer unit 130, an FSK modulation circuit 150, an FSK demodulation circuit 160, an FM demodulation circuit 170, a telephone set TEL, a mobile unit or radio communication unit TRX for the telephone set, a connection switching means or branch connecting circuit 180, an amplifier AMP, a speaker SP and a relay RL2.

Both output terminals of the FSK modulation circuit 100 and the FM modulation circuit 95 are connected to a light emitting means, i.e., three light emitting diodes LE1, LE2 and LE3, while both input terminals of the FSK demodulation circuit 160 and the FM demodulation circuit 170 are connected to a light receiving means, i.e., three photo diodes PD1, PD2 and PD3. Likewise, three photo diodes PD4, PD5 and PD6 are connected to an input terminal of the FSK demodulation circuit 110, while three light emitting diodes LE4, LE5 and LE6 are connected to an output terminal of the FSK modulation circuit 150.

A power line leading from a road-vehicle battery is connected to the constant-voltage power supply 120 incorporated in the control unit on the vehicle body side and a slip ring SA2 via a switch SW in interlock with an ignition key switch. To the slip ring SA2 is electrically connected a brush BA2, which in turn is connected to the constant-voltage power supply circuit 70 on the steering operation board side via a brush BA1 and a slip ring SA1 in contact with BA1.

Figure 2A:
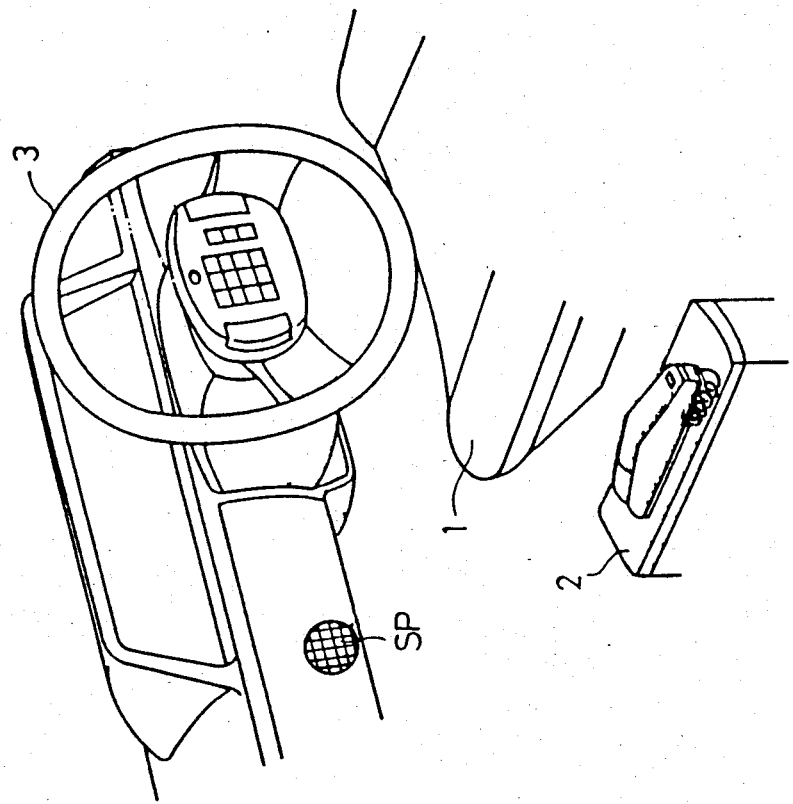
FIG. 2a is a perspective view showing the surroundings of a steering wheel and a driver's seat of an automotive vehicle equipped with the apparatus shown in FIG. 1.
Figure 2B:
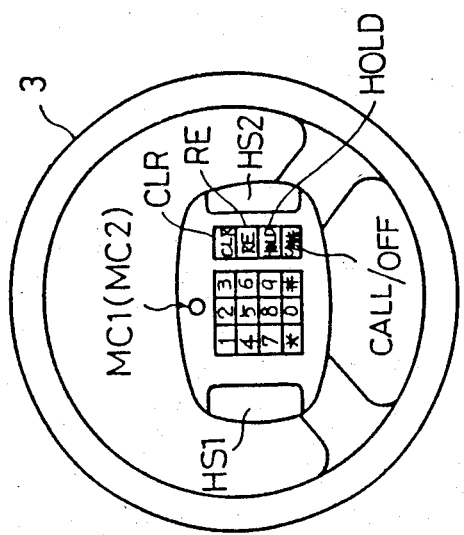

FIG. 2a shows the surroundings of the driver's seat of the vehicle equipped with the apparatus shown in FIG. 1, and FIG. 2b shows an external appearance of the steering wheel. Referring now to FIGS. 2a and 2b, the telephone set 2 (TEL) is placed to the left of the driver's seat 1 and the speaker SP is disposed in front of the seat 1. At the central portion of the steering wheel 3 is disposed an operation panel in a floating relation with respect to the steering wheel 3. The operation panel includes twelve key switches 0 to 9, * and # identical to those on a push button type phone, horn switches HS1 and HS2 on both sides, a clear key CLR, a hold key HOLD, a call-off key CALL/OFF and the microphone MC1. The microphone MC2 is disposed behind the microphone MC1.

Figure 2C:
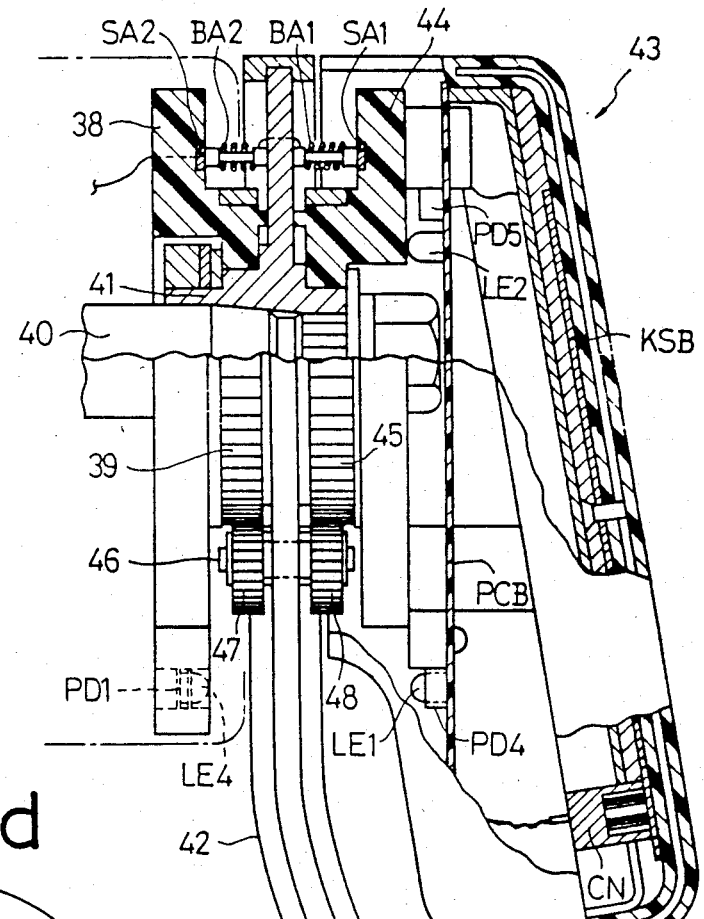
Figure 2D:
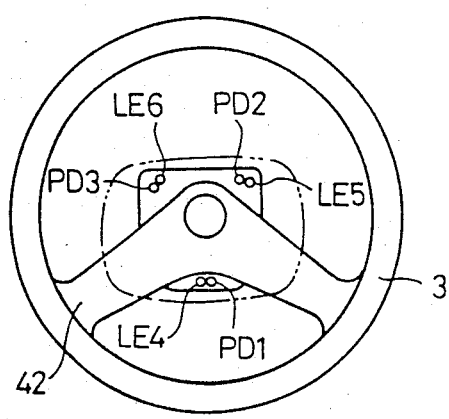
FIG. 2d is a front view showing arrangement of light emitting diodes and photo diodes positioned on the steering operation board facing each other.

FIG. 2c shows a mounting structure of the steering wheel 3 and the steering operation board onto the vehicle body.

Referring now to FIG. 2c, a first support 38 is fixed to a body of the vehicle and an external gear 39 is secured to the first support 38. The numeral 40 denotes a steering main shaft. A second support 41 is secured to the steering main shaft 40 and is rotatable with respect to the first support 38. The second support 41 is integral with the steering wheel 30 and spokes 42.

The numeral 43 denotes a steering wheel control board which is supported by a third support 44. An external gear 45 is secured to the third support 44, while a shaft 46 is rotatably supported by the second support 41. At both ends of the shaft 46 there secured pinion gears 47 and 48 with the same number of teeth, the pinion gears 47 and 48 being meashed with the external gears 39 and 45, respectively.

Both external gears 39 and 45 have the same number of teeth. Therefore, when the spokes 42 are rotated upon operation of the steering wheel, the second support 41 is rotated and hence the steering main shaft 40 connected to the second support 41 is also rotated. At this time, the shaft 46 revolves round both external gears 39 and 45 along the outer periperies thereof, and the pinion gears 47 and 48 connected to the shaft 46 are rotated by the same angle, so that the relative position of the external gears 39 and 45 remains unchanged. In other words, the steering control board 43 is not changed in its position (i.e., inclination) with respect to the vehicular body even with the steering wheel being turned.

The steering operation board 43 comprises a printed circuit board PCB including the microcomputer 80, the FM modulation circuit 95, the FSK modulation circuit 100 and the FSK demodulation circuit 110, and a key switch board KSB equipped with a number of key switches, the PCB and the KSB being connected to each other through a connector CN. A power line on the input side of the steering operation board is connected to the slip ring SA1 formed on the third support 44. The metal-made brush BA1 has one end brought into contact with the slip ring SA1 and the other end fixed to the second support 41. To the opposite side of the second support 41 is fixed one end of the brush BA2 of the same structure as BA1, the other end of the brush BA2 being in contact with the slip ring SA2 formed on the surface of the first support 38.

The printed circuit board PCB further includes the photo diodes PD1, PD2 and PD3 as well as the photo transistors PT4, PT5 and PT6 used for transmission of signals, which are disposed at predetermined positions spaced from the steering main shaft 40 by almost equal distances in an angularly dispersed relation. On the stationary member side, e.g., on the first support 38, there are mounted the photo diodes PD4, PD5 and PD6 as well as the photo transistors PT1, PT2 and PT3 used for transmission of signals, which are positioned opposite to the photo transistors PT4, PT5 and PT6 and the photo diodes PD1, PD2 and PD3, respectively.

The set positions of these photo diodes and photo transistors are selected in relation to the position of the spokes, as shown in FIG. 2e. More specifically, the positions are so selected that when the two spokes 42 are moved upon turning operation of the steering wheel 30, three pairs of optical paths respectively connecting the photo diodes PD1, PD2 and PD3 on the steering control board 43 to the photo transistors PT1, PT2 and PT3 on the stationary member side and optical paths respectively connecting the photo diodes PD4, PD5 and PD6 on the stationary member side to the photo transistors PT4, PT5 and PT6 on the steering control board 43 are not interrupted simultaneously at the least.

With the illustrated arrangement, for example, even if the optical paths between PD1-PT1, PD2-PT2, PD4-PT4 and PD5-PT5 be interrupted by the spokes 42, the optical paths between PD3-PT3 and PD6-PT6 will not be interrupted. As an alternative, in case the optical paths between PD1-PT1, PD3-PT3, PD4-PT4 and PD5-PT5 are interrupted by the spokes 42, the optical paths between PD2-PT2 and PD5-PT5 remain uninterrupted.

Figure 3A:
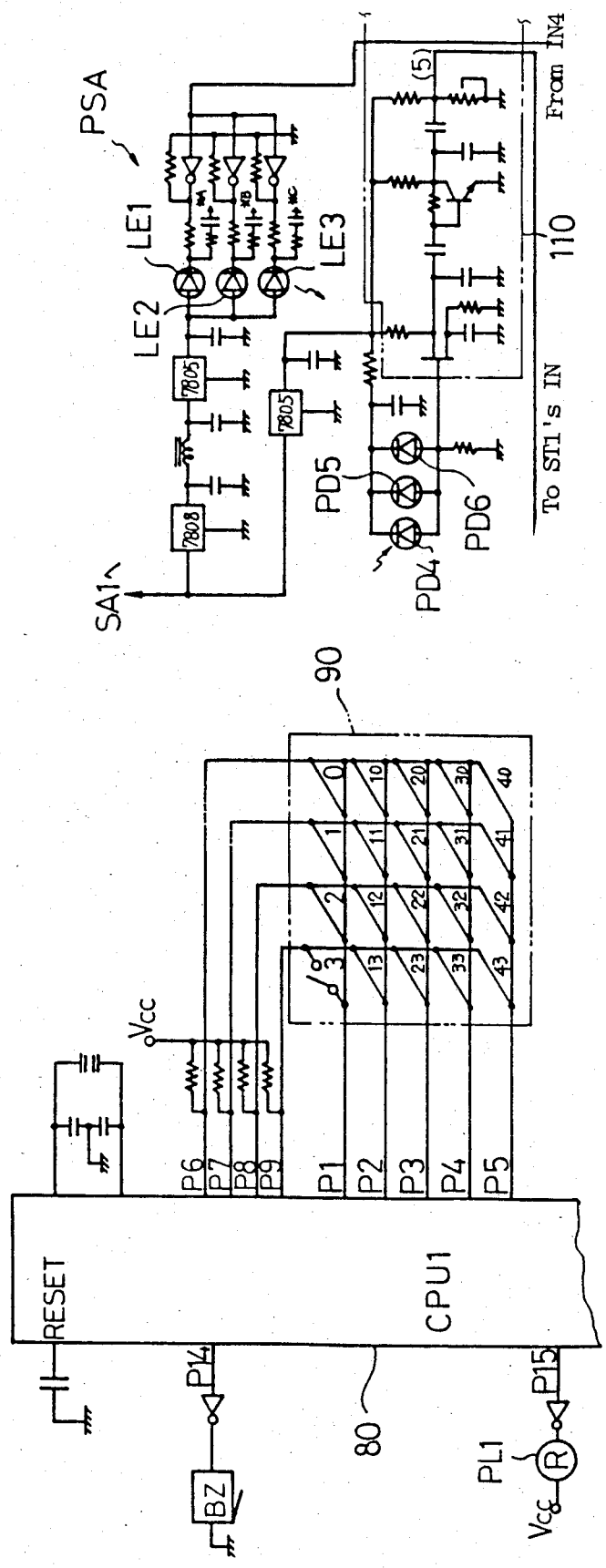
FIGS. 3a, 3b and 3c are block diagrams showing an electric circuit of the apparatus shown in FIG. 1 which is incorporated in the operation board on the steering wheel.
Figure 3B:
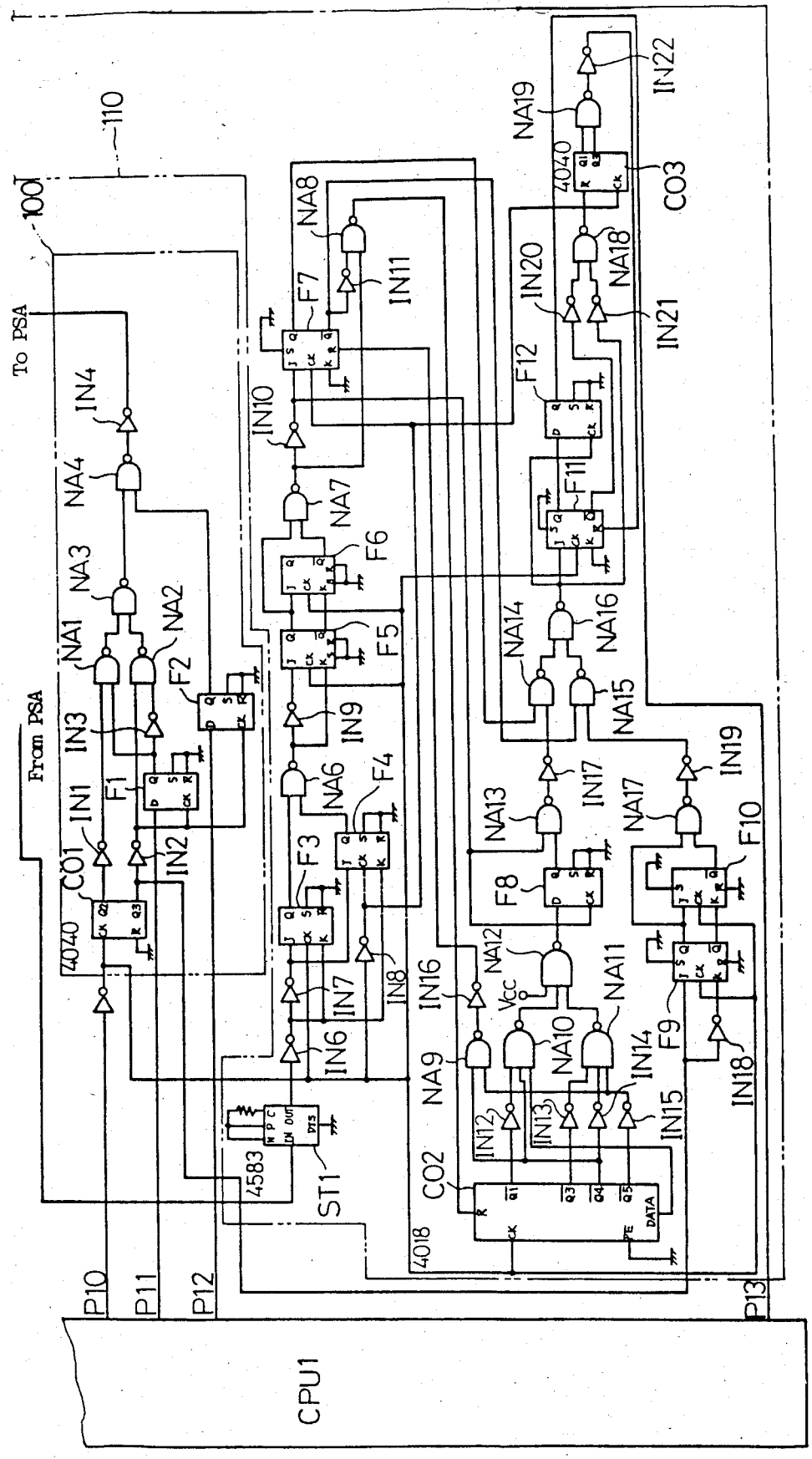
Figure 3C:
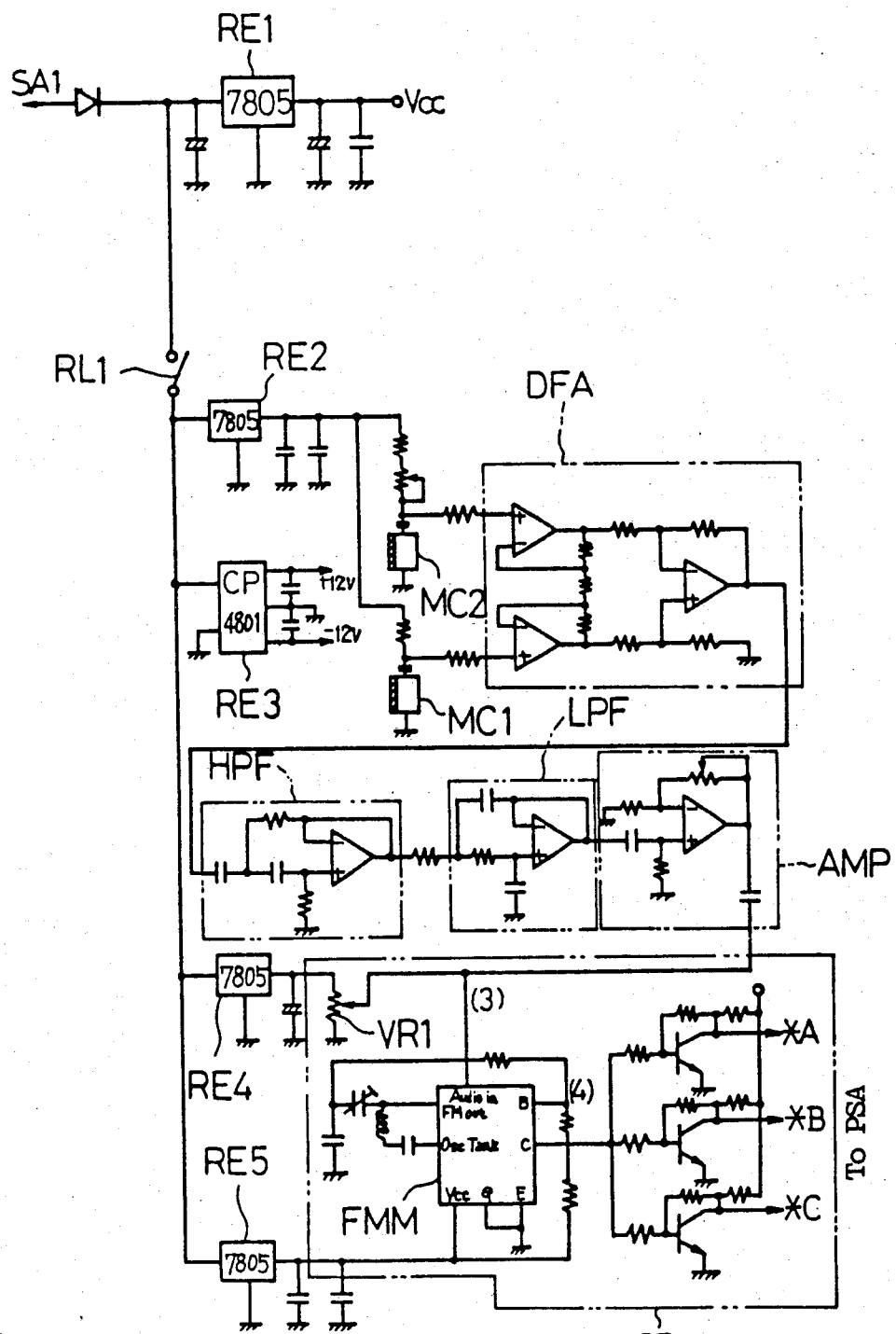

FIGS. 3a, 3b and 3c show the construction of an electric circuit incorporated in the steering operation board. The description will be first made by referring to FIGS. 3a and 3b. The key switch 90 comprises a number of switches which are connected to five output ports P1 through P5 and four input ports P6 through P9 of the microcomputer 80 in the form of a matrix. The contact of each of these switches is opened and closed upon when the corresponding key on the operation panel is operated. The FSK modulation circuit 100 has its output terminals connected to three output ports P10, P11 and P12, and has its output terminal connected to a circuit for actuating the light emitting diodes LE1, LE2 and LE3. As seen from the figures, the FSK modulation circuit 100 comprises a counter C01, D-type Flip-Flops F1, F2, NAND gates NA1 through NA4, inverters IN1 through IN4, etc.

The FSK demodulation circuit 110 has its output terminal connected to the photo diodes PD4, PD5 and PD6, and has its output terminal connected to an input port P13 of the microcomputer 80. As seen from the figures, the FSK demodulation circuit 110 comprises a preamplifier PSA consisted of an FET, transistor and other parts, a Schmitt trigger ST1 (MC14583 made by Motorola Co.), a counter C02 (MC14018 made by Motorola Co.), CO3, NAND gates NA6 through NA19, inverters IN6 through IN22, etc. From the standpoint of function, the FSK demodulation circuit 110 is composed of a waveform shaping/differentiation circuit comprising ST1, F3, F4, F5, F6, NA6, NA7, inverters IN6 through IN10, etc., an external input priority circuit comprising F7, CO2, F8, NA8 through NA16 and IN11 through IN17, a reference signal generating circuit comprising F9, F10, NA17, IN18 and IN19, and a frequency discrimination circuit comprising F11, F12, C03, NA18, NA19 and IN20 through IN22.

A buzzer BZ is connected to an output port P14 of the microcomputer 80 via an inverter, and the relay RL 1 is connected to an output port P15 thereof via an inverter.

Referring now to FIG. 3c, the relay RL1 has one contact connected to a power source line leading from the slip ring SA1 and has the other contact connected to constant-voltage circuits RE2, RE3, RE4 and RE5. An output terminal of a power supply circuit comprising a 3-terminal constant-voltage circuit RE1 or the like and a capacitor is directly connected to the power source line of the electric circuit shown in FIG. 3a. In this connection, the RE3 is formed of a switching type constant-voltage circuit (CP4801) and generates stable voltage of ±12 V for operational amplifiers. The microphones MC1 and MC2 are connected to the differential amplifier DFA formed of an operational amplifier. An output terminal of the differential amplifier DFA is connected to a high-pass filter HPF formed of an operational amplifier. Then, an output terminal of the HPF is connected to a low-pass filter LPF formed of an operational amplifier. An output signal from the low-pass filter LPF is amplifier by the amplifier AMP and then applied to an input terminal Audio-in of the FM modulator FMM through a capacitor. To the input terminal Audio-in of the FMM is also applied the given DC bias voltage through a variable resistor VR1. The variable resistor VR1 is to set the center frequency of an FM modulation wave. The FM modulator FMM is formed a single integrated circuit, and the FM modulation circuit 95 comprises the FMM and an electric coil, capacitors, resistors and so on which are connected to the corresponding terminals of the FMM. Output terminals (collectors) of three transistors connected to an output terminal C of the FM modulator FMM are connected to the light emitting diodes LE1, lE2 and LE3 shown in FIG. 3a, respectively.

Figure 4A:
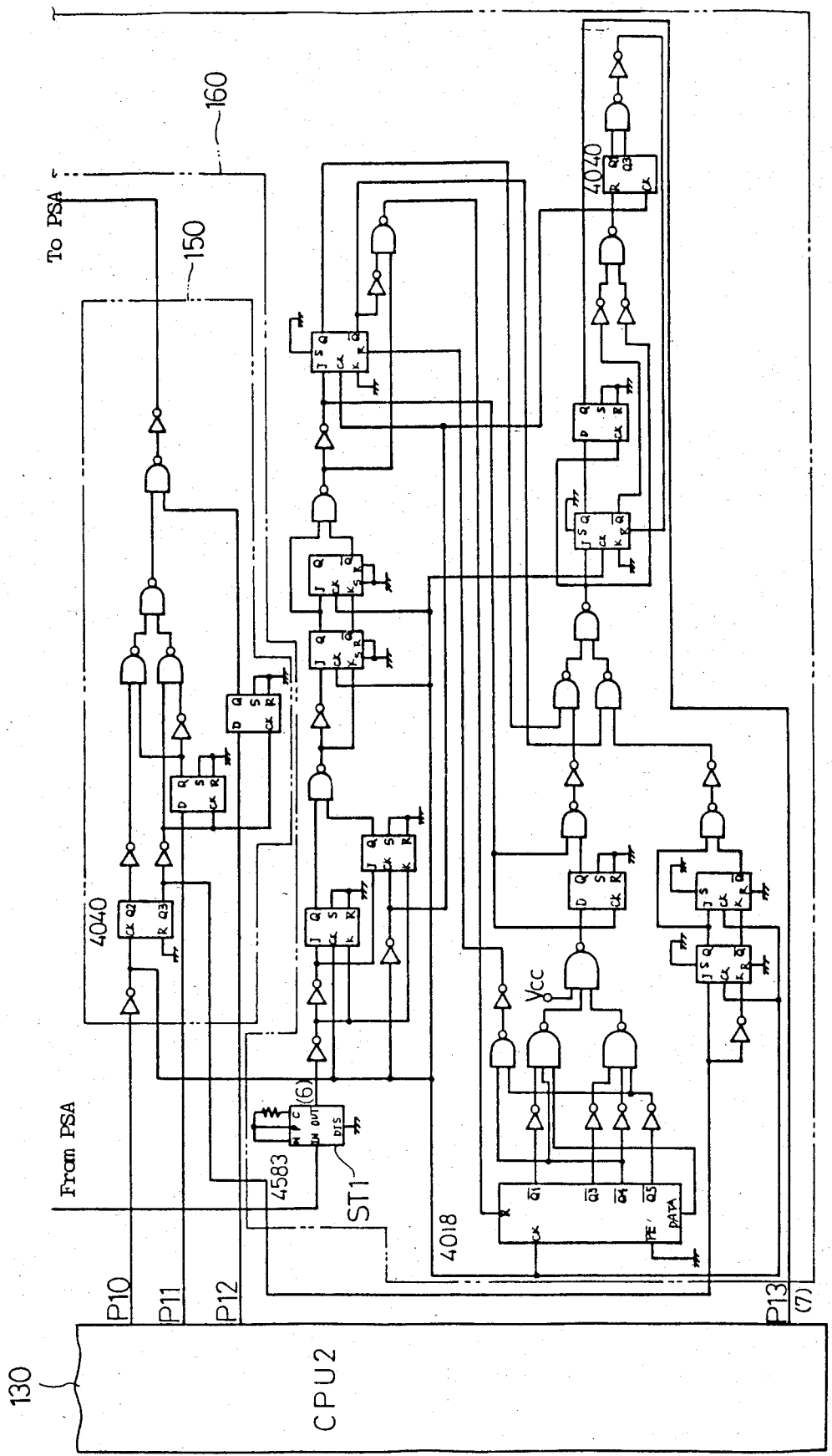
FIGS. 4a, 4b and 4c are block diagrams showing an electric circuit of the apparatus shown in FIG. 1 which is incorporated on the vehicle body side.
Figure 4B:
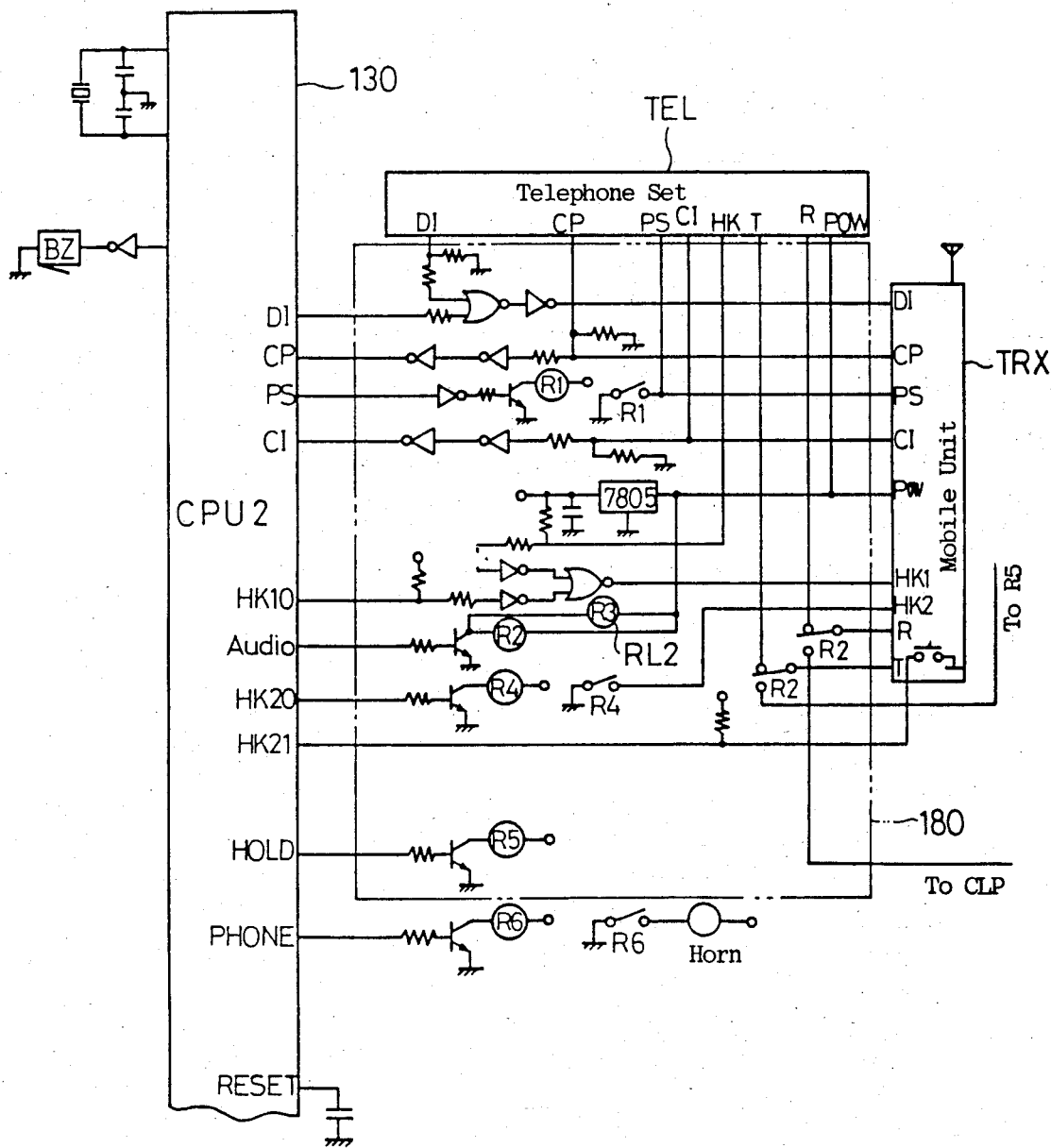
Figure 4C:
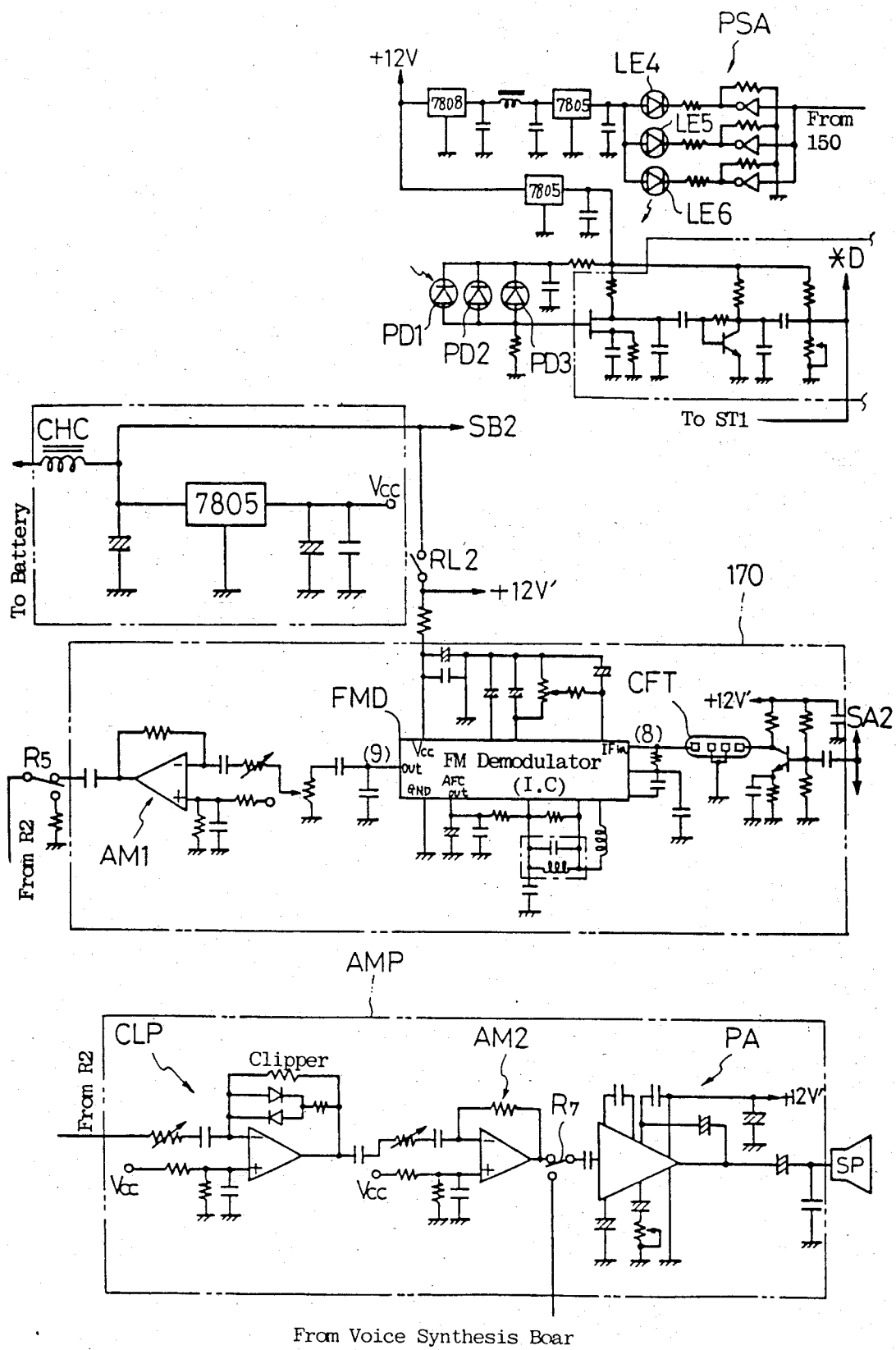

FIGS. 4a, 4b and 4c show an electric circuit incorporated in the control unit on the vehicle body side. Referring now to FIGS. 4a, 4b and 4c, the FSK modulation circuit 150 and the FSK demodulation circuit 160 are connected to the microcomputer 130. An output terminal of the FSK modulation circuit 150 is connected to a circuit for actuating the light emitting diodes LE4, LE5 and LE6, while an input terminal of the FSK demodulation circuit 160 is connected to the photo diodes PD1, PD2 and PD3.

The FSK modulation circuit 150 and the FSK demodulation circuit 160 are respectively constructed in the same manner as the FSK modulation circuit 100 and the FSK demodulation circuit 110. The constant-voltage power supply circuit 120 includes an electric coil CHC for blocking the high frequency component, the CHC having one end connected to the road-vehicle battery through the ignition key switch SW and the other end connected to the slip ring SA2.

An input terminal of the FM demoduation circuit 170 is connected to the photo diodes PD1, PD2 and PD3 via a preamplifier PSA of the FSK demodulation circuit 160 as shown in FIG. 4a. As seen from the figures, the FM demodulation circuit 170 comprises a ceramic filter CFT, an integrated circuit FMD adapted to demodulate an FM signal, a low frequency amplifier AM1, etc. Power source for the FM demodulation circuit 170 is supplied thereto through a contact of the relay RL2. An output terminal of the FM demodulation circuit 170 is connected to a contact of a relay R5. The amplifier AMP connected to the speaker SP comprises a clipper CLP, a low frequency amplifier AM2 and a power amplifier PA. The power amplifier PA is of an output transformerless (OTL) type. An input terminal of the amplifier AMP is connected to one contact of the relay R2. To other ports of the microcomputer 130 are connected the branch connection circuit 180, a transistor for controlling a relay R6 adapted to drive the horns, and an inverter for driving an buzzer BZ. To the branch connection circuit 180 are connected the telephone set TEL, mobile unit TRX, FM demodulation circuit 170 and the amplifier AMP.

In a block of the telephone set TEL, designated at DI is a dial code output terminal, CP is an output terminal for clock pulses of 1200 baud, PS is an input terminal for power source ON/OFF control, CI is an input terminal for a restriction command signal ("0": call enable, "1": call disable), HK is an output terminal for a hook signal (ON hook/OFF hook), T is an output terminal for the transmitted audio signal, R is an input terminal for the received audio signal, and POW is a power source terminal.

In the mobile unit TRX, designated at HK1 and HK2 are input terminals for the hook signal. The branch connection circuit 180 includes the relays R1, R2, R3(RL2), R4 and R5 which are controlled by the microcomputer 130.

Operation of the FSK modulation circuit 100 (or 150) will be now described schematically by referring to FIG. 3a. To the input terminal of the FSK modulation circuit 100 is applied a pulse signal of constant period (T/4) from the output port P10 of the microcomputer 80. The counter CO1 divides the frequency of the applied pulse signal to generate a pulse signal of period T at its output terminal Q2 and a pulse signal of period 2T at its output terminal Q3. The pulse signal of period 2T is also applied to the later-described FSK demodulation circuit 110. The output port P11 of the microcomputer 80 serves as an output terminal for the data to be transmitted. The Flip-Flop F1 sets at its output terminal Q a level in accordance with the data from the port P11 (data "1": high level H, data "0": low level L) in synchronous relation with rising of the pulse signal of period 2T applied to its clock input terminal CLK. Therefore, with the data assuming "1", the output terminal Q of F1 becomes H, so that the pulse signal of period T from Q2 of F1 appears at an output terminal of the NAND gate NA3 through the NAND gate NA1. With the data assuming "0", the output terminal Q of F1 becomes L, so that the pulse signal of period 2T from Q3 of CO1 appears at the output terminal of the NAND gate NA3 through the NAND gate NA2.

The output port P12 of the microcomputer 80 issues a signal used in output enable/disable control for an FSK signal to the transmission path. When the port P12 assumes a high level H, an output terminal Q of the Flip-Flop F2 becomes a high level H in synchronous relation with the pulse of period 2T issued from CO1. With this, the gate NA4 is opened and the signal of period T or 2T from the output terminal of NA3 is applied to the circuit for actuating the light emitting diodes LE1, LE2 and LE3 via both the NAND gate NA4 and the inverter IN4.

In this way, a level of the current passing through the light emitting diodes LE1, LE2 and LE3 is changed, whereupon the intensity of light beams from LE1, LE2 and LE3 is varied in a binary manner. When the port P12 assumes a low level L, the output terminal Q of F2 turns to L and the gate NA4 is closed, so that the FSK signal is not applied to the light emitting diodes LE1, LE2 and LE3. Besides, it is arranged that a predetermined bias current is always made to flow into the respective light emitting diodes LE1, LE2 and LE3, so these diodes generate light beams at all times.

Figure 5A:
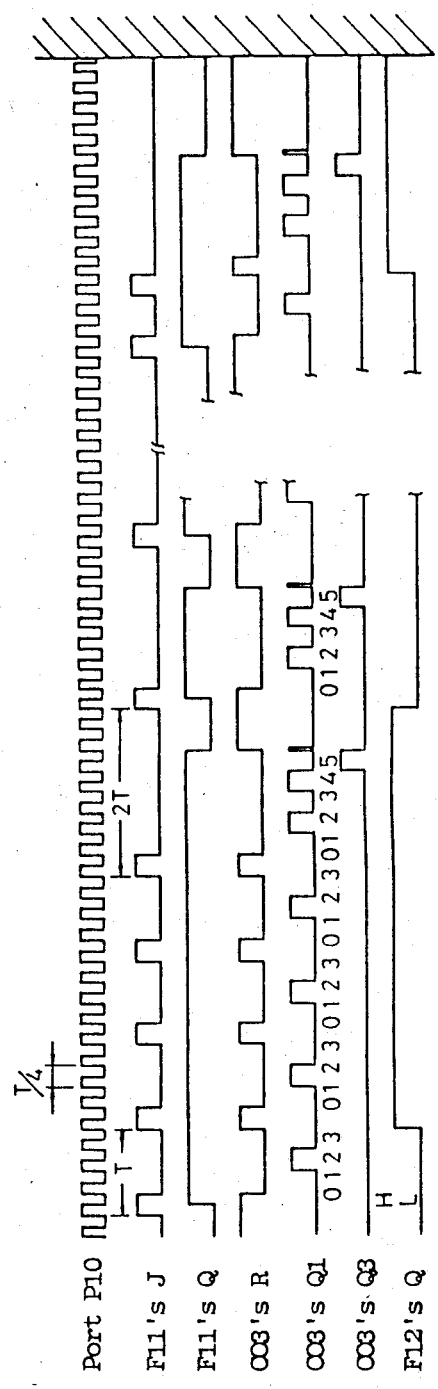

FIG. 5a shows schematically timing of the FSK frequency discrimination circuit in FIGS. 3a and 4a. Operation of this circuit will now be described by referring to FIG. 5a.

To clock input terminals CK of the Flip-Flop F11 and the counter CO3 are applied clock pulses of period T/4 from the port P10 of the microcomputer at all times. An FSK signal from the outside is applied to a J input terminal of F11, a clock input terminal of the Flip-Flop F12 and other input terminals. In this embodiment, the FSK signal is arranged such that it has a period of T with the data assuming "1" (high level H) and has a period of 2T with the data assuming "0" (low level L). In the initial state, the counter CO3 is being reset.

When the J input terminal of F11 turns to a high level upon coming of the FSK signal, Q and $\overline{Q}$ output terminals of F11 are respectively set to H and L in synchronous relation with the clock pulses (T/4). With this, the counter CO3 is released from its reset state and it starts to count the clock pulses (T/4).

In case of the FSK signal of T period, the FSK signal turns to H at the time when the counter CO3 counts the numbers 0, 1, 2 and 3, and the counter CO3 is reset once again. At the same time, the Flip-Flop F12 sets a level present at its input terminal D, i.e., H, to its output terminal Q, so that a high level H in accordance with the data "1" is issued at the output terminal of F12 as a demodulated output signal.

In case of the FSK signal of period 2T, the counter CO3 counts the numbers 0, 1, 2, 3, 4 and 5 and at the count 5 it applies a reset signal to the Flip-Flop F11 through the NAND gate NA19 and the inverter IN22. Upon this, F11 is reset to assume L at its output terminal Q and H at its output terminal $\overline{Q}$. As a result, the counter CO3 is also reset. Subsequently, when the FSK signal turns to a high level H, the Flip-Flop 12 sets an output level L of F11 at its output terminal Q, i.e., demodulation output terminal. Thus, with the predetermined FSK signal being applied, this frequency discrimination circuit serves to demodulate the applied signal and then outputs the data.

However, if a noise or so similar to the FSK signal of period T should be applied to the frequency discrimination circuit, an output terminal Q of the Flip-Flop F5 is set to H in response to the noise and a high level H is output as a demodulated output signal. And in case no signal and noise is applied thereto after that, the Q output terminal of the Flip-Flop F12 will be held in the state being set to a high level H.

If such state continues over a predetermined time, the microcomputer 80 (or 130) connected to the demodulation circuit judges that the data has come and then starts to read the data by mistake. To prevent such erroneous operation, according to this embodiment there are provided a reference signal generating circuit and an external input priority circuit.

Figure 5B:
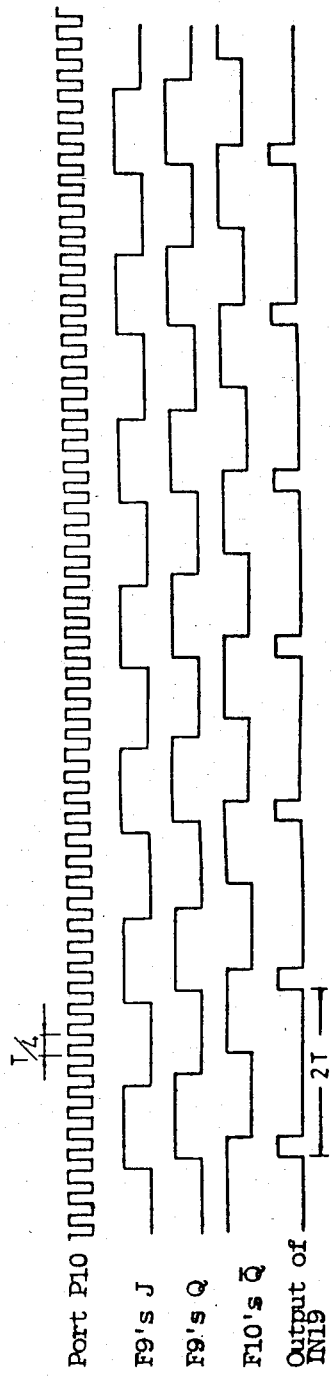

FIG. 5b shows timing in operation of the reference signal generating circuit. Referring now to FIG. 5b, clock pulses of T/4 period from the port P10 are applied to the clock input terminals CK of the Flip-Flops F9 and F10 and, at the same time, the frequency is divided by eight in the counter CO1 of the FSK modulation circuit 100 (or 150) to attain a pulse signal of 2T period which is applied to a J input terminal of F9, etc.

The Flip-Flops F9 and F10, etc. operates as a differentiation circuit, and a reference signal of pulse width (period of high level H) T/4 and period 2T is obtained at the output terminal of the inverter IN19. Since this reference signal has a period of 2T, the frequency discrimination circuit judges the reference signal as the data of "0" when applied to the frequency discrimination circuit, so that the demodulation output circuit is set to a low level L.

FIG. 5c shows timing in operation of the external input priority circuit. The description will be now made by referring to FIG. 5c. The FSK signal from the waveformshaping/differentiation circuit (i.e., signal output from NA7) is applied to the inverter IN10 and the NAND gate. An output signal of the inverter IN10 is applied to the Flip-Flops F7, F8 and the NAND gate NA13, while an output signal from the NAND gate NA8 is applied to a reset input terminal of the counter CO2. To clock input terminals CK of the counter CO2 and the Flip-Flop F7 are applied clock pulses of period T/4.

When the FSK signal is applied to the external input priority circuit and an input terminal of the inverter IN10 assumes a low level L, output terminals Q and $\overline{Q}$ of the Flip-Flop F7 are respectively set at H and L in synchronous relation with the clock pulses of period T/4. Signals from the output terminals Q and $\overline{Q}$ of F7 are applied to the NAND gates NA14 and NA15, respectively.

The NAND gates NA14, NA15 and NA16 constitute a signal selecting circuit which applies selectively the FSK signal and the reference signal from the reference signal generating circuit to the aforesaid frequency discrimination circuit in accordance with the states of the output terminals Q and $\overline{Q}$ of the Flip-Flop F7. When the Q terminal of the Flip-Flop F7 is set at H, the FSK signal is applied to the frequency discrimination circuit from the inverter IN17. Meanwhile, when the output terminal $\overline{Q}$ of F7 is set at L, the counter CO2 is released from the reset state and hence it starts to count the clocks.

In case of the FSK signal of period T, after counting the numbers 0, 1, 2 and 3, the counter CO2 is now reset in accordance with the state of the subsequent FSK signal and starts to count the numbers 0, 1, 2 and 3 once again. In case of the FSK signal of period 2T, after the Flip-Flop F7 is set, the counter CO2 counts the numbers 0, 1, 2, 3, 4, 5 and 6 and then it is reset.

More specifically, in the presence of the FSK signal, since a reset signal H is not applied to the reset input terminal R of the Flip-Flop F7 in both cases of the FSK signal having period of T and 2T, the output terminals Q and $\overline{Q}$ of F7 are respectively held in the H and L state. In such state, since a high level H is issued at the output terminal Q of the Flip-Flop F8 in the predetermined timing, the FSK signal input to the inverter IN10 is applied to the NAND gate NA14 through the NAND gate NA13 and the inverter IN17.

At this time, a high level of H is applied to the other input terminal of the NAND gate NA14, so that the FSK signal is applied to the frequency discrimination circuit through both NA14 and NA15. Also on this occasion, one input terminal of the NAND gate NA15 assumes a low level L, whereby the reference signal fed from the reference signal generating circuit is not issued from NA15.

In the absence of the FSK signal, since the counter CO2 will not be reset at the count 6, it continues to count the numbers 0, 1, 2, 3, 4, 5, 6, 7, 8 and 9. When the counted value reaches 9, i.e., when it has lapsed 3T from starting of the count, a high level (reset level) H is applied to the reset input termnal R of the Flip-Flop F7 through the NAND gate NA9 and the inverter IN16, thereby to reset F7.

In this way, the output terminals Q and $\bar{Q}$ of the Flip-Flop F7 are inverted to L and H, respectively. With the terminal $\bar{Q}$ of F7 assuming H, a reset signal is applied to the counter CO2. This reset signal will be continued until a low level L is next applied to the inverter IN10 and the terminal $\bar{Q}$ of F7 is set at L once again. Upon inversion of levels at the output terminals Q and $\bar{Q}$ of the Flip-Flop F7, the NAND gate NA14 is closed and the NAND gate NA15 is opened instead, whereby the reference signal from the inverter IN19 is now applied to the frequency discrimination circuit through the NAND gate NA16.

FIG. 6 shows schematically signal waveforms in the entire apparatus. Referring now to FIG. 6, the description will be described on the case of transmitting signals from the steering operation board as shown in FIGS. 3a, 3b and 3c to the apparatus as shown in FIGS. 4a, 4b and 4c.

As previously noted, in the state where the output port P12 of the microcomputer 80 holds a high level H and clock pulses of period T/4 are applied to P10, when a level H or L is set at the output port P11 in accordance with the data to be transmitted, a pulse signal of period T or 2T corresponding to the set level, i.e., FSK signal, appears at the output terminal of the inverter IN5. Upon this FSK signal, the intensity of light beams radiated from the light emitting diodes LE1, LE2 and LE3 is varied in a binary manner.

On the other hand, when voices are input to the microphones MC1 and MC2, an audio signal is amplified by the differential amplifier DFA and then applied to the Audio-in terminal of the FM modulator FMM via the high-pass filter HPF, the low-pass filter LDF and the amplifier AMP. With this, a sinusoidal signal of relatively small amplitude modulated in its frequency with the audio sgianl appears at the output terminal of the FM modulation circuit 95, and this sinusoidal signal is applied to the light emitting diodes LE1, LE2 and LE3 through a capacitor.

Accordingly, the light emitting diodes LE1, LE2 and LE3 are actuated by a superimposed signal comprising the FSK signal and the sinusoidal FM signal modulated with the audio signal, and there appears in the transmission path a light signal of the intensity in accordance with the actuated level. The light signal passing through the transmission path is received by at least one of the photo diodes PD1, PD2 and PD3 and then converted to an electric signal. This electric signal is applied to the FSK demodulation circuit 160.

The FSK demodulation circuit 160 converts the signal thus attained to an FSK signal through the Schmitt trigger ST1, demodulates the FSK signal to the data of "1" or "0" in accordance with the period of the FSK signal, and then applies the data to the input port P13 of the microcomputer 130.

At the same time, the electric signal obtained by the photo diodes PD1, PD2 and PD3 is also applied to the FM demodulation circuit 170 after amplification. The demodulation circuit 170 takes only the FM modulated signal out of the applied signal through a ceramic filter CFT and then applies it to an integrated circuit FMD for FM demodulation. The circuit FMD serves to demodulate the original audio signal from the FM modulated wave and to apply the demodulated audio signal to the amplifier AM1.

Figure 7:
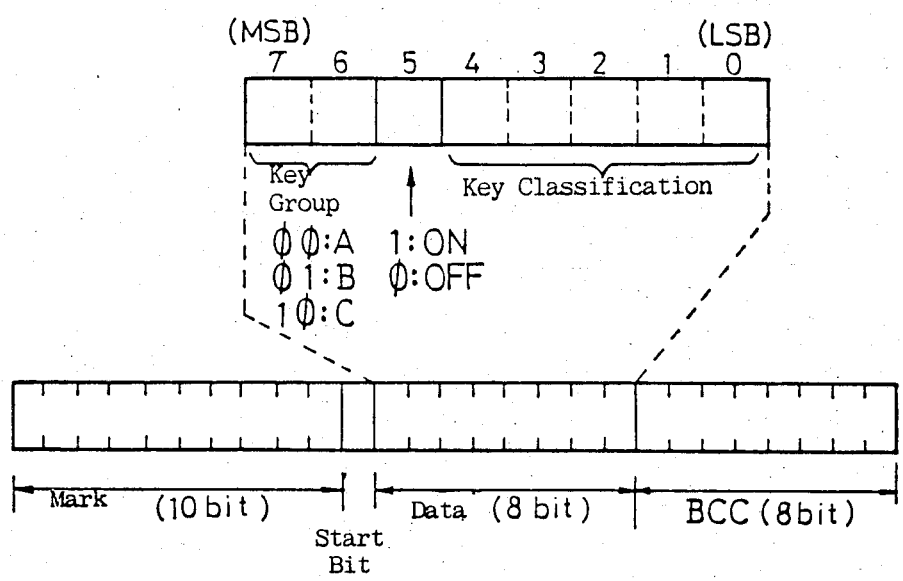
FIG. 7 is a block diagram showing the construction of a data train of a signal (FSK) transmitted by the apparatus shown in FIG. 1.

FIG. 7 shows a construction of the signal which is applied to the FSK signal modulation circuit 100 and 150 from the microcomputers 80 and 130 respectively in this embodiment. The signal is consisted of a mark signal of the first 10 bits (high level: "1"), a start bit of the subsequent 1 bit, the data of 8 bits, and a BCC code of 8 bits. As to the 8-bit data, the bits 0 to 4 designate the kind of keys, the bit 5 designates ON/OFF of keys ("1"; ON, "0"; OFF), and the bits 6 and 7 designate the group of keys.

In this embodiment, the keys are divided into three groups; the group A represented by "00", the group B represented by "01" and the group C represented by "10". Referring now back to FIG. 2b, the key group A includes the numeral keys (0 to 9), * and # keys, clear key CLR and the hold key HOLD, the key group B includes the horn keys HS1 and HS2, and the key group C includes the call-off key CALL/OFF.

Figure 8:
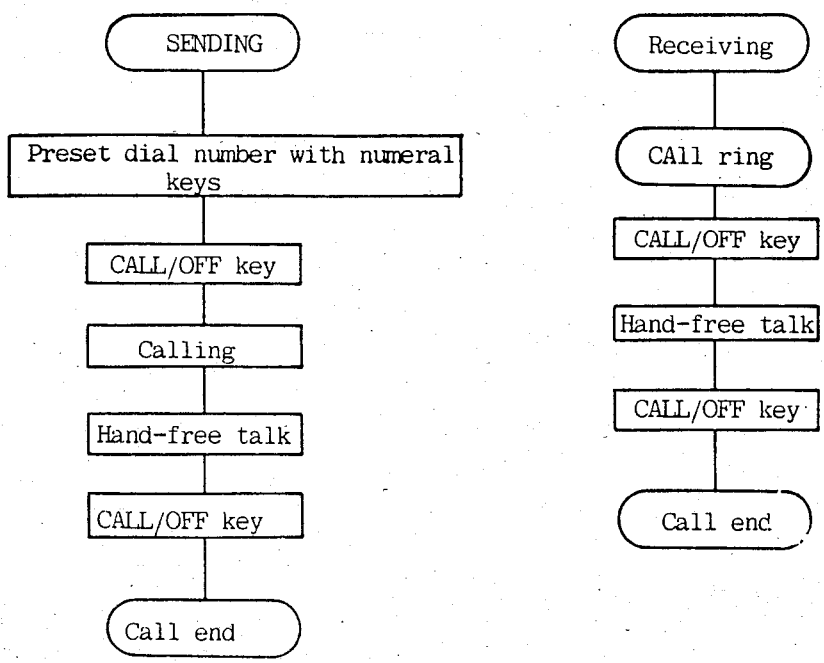
FIG. 8 is a flow chart schematically showing both sending operation and receiving operation when a telephone call is made by a telephone set incorporated in the apparatus shown in FIG. 1.

FIG. 8 shows schematically operation of the apparatus in case of actuating the road-vehicle telephone into the sending and receiving modes from the steering operation board. The description will be now made by referring to FIG. 8.

Sending Operation

The telephone number of the other party is input using the numeral keys and * and # keys on the steering wheel operation board. Upon this, the microcomputer stores the key-input telephone number.

It waits for operation of the call-off key CALL/OFF.

When the call-off key CALL/OFF is operated, the other party corresponding to the stored telephone number is called automatically. When the called party takes up the receiver (i.e., off the hook), the apparatus comes into the state permitting a hand-free talk. In this connection, with the hold key HOLD being operated, the relay R5 is actuated and the transmitter, namely, the microphones MC1 and MC2 on the steering wheel, is interrupted from the mobile unit TRX, whereby it is stopped to send voices from the vehicle.

When the call-off key CALL/OFF is operated once again, this is judged as completion of a telephone call and communication is ended.

Receiving Operation

When the road-vehicle telephone set is called from the other party, there sounds a call ring.

It waits for operation of the call-off key CALL/OFF.

When the call-off key CALL/OFF is operated, the apparatus comes into the came state as where the receiver is being taken up in the normal case, so that voices of the other party are issued from the speaker SP and the microphones MC1 and MC2 on the steering operation board are connected to the road-vehicle telephone set as a transmitter. When the call-off key CALL/OFF is operated once again, this is judged as completion of a telephone call and communication is ended.

Figure 9A:
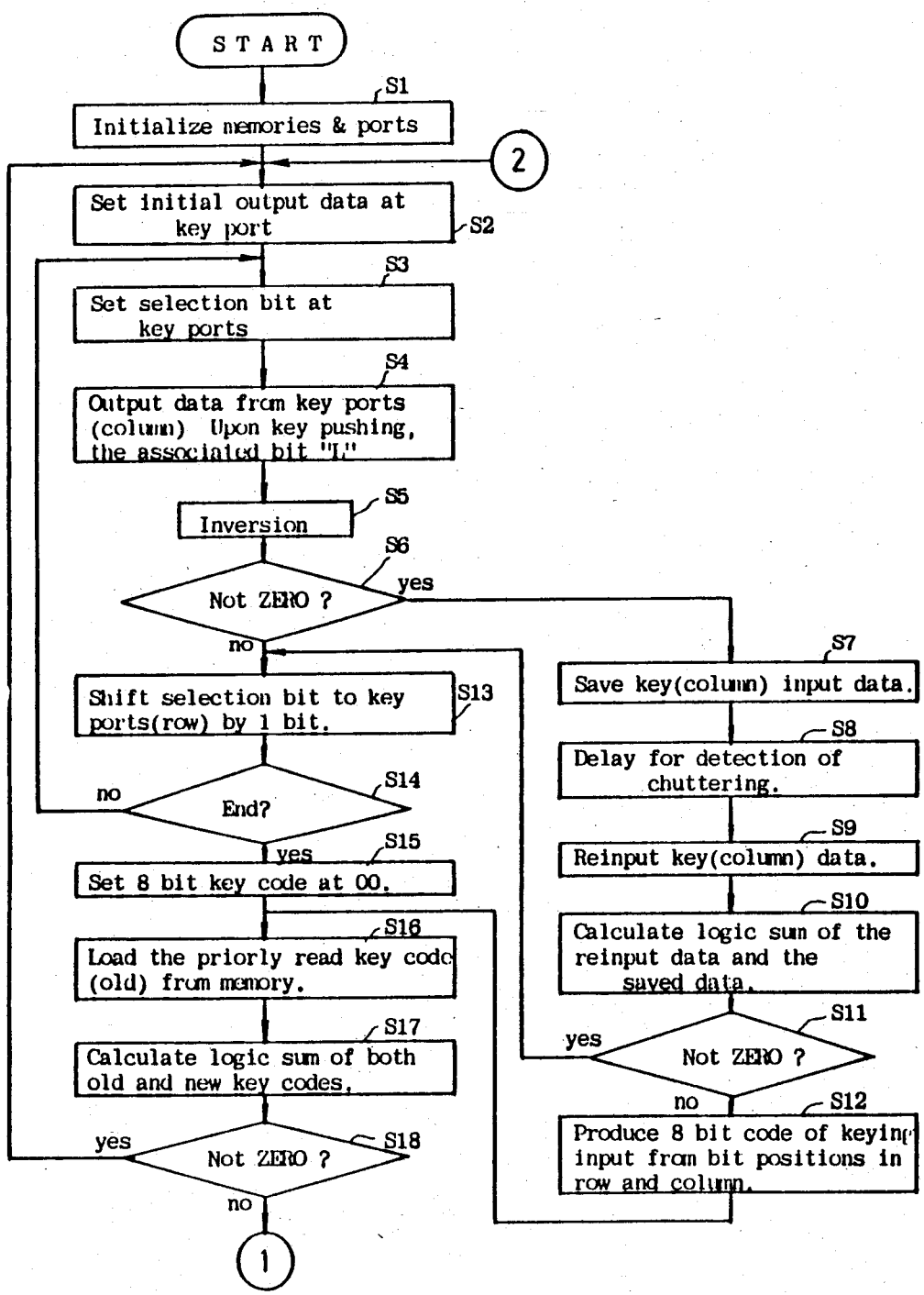

FIGS. 9a and 9b show operation of the steering operation board as shown in FIGS. 3a, 3b and 3c. Operation steps of the steering operation board will be now described in detail by referring to FIGS. 9a and 9b.

S1 The state of each output port of the microcomputer 80 is set at the initial level with the content of the memory being as the initial value. With this processing, the output port P12 assumes a low level L and output of the FSK signal is inhibited.

S2 The data issued to the key reading signal output ports, i.e., P1 to P5, is set at the initial value. This initial data is selected such that the bits corresponding to the output ports connected to rank lines of the key matrix allowing to start reading assume "0" (i.e., low level L) and other bits assume "1" (i.e., high level H). In this embodiment, it is arranged that the bit corresponding to the port P1 assumes "0" and the bits corresponding to the ports P2, P3, P4 and P5 assume "1".

S3 The predetermined data is output to the ports P1 to P5. Upon this, certain ones among those ports P1 to P5 indicate a low level L and remaining ports indicate a high level H.

S4 Levels at the input ports P6 to P9 connected to column lines of the key matrix are read out. Referring to FIG. 3a, since the input ports P6 to P9 are pulled up to the power source line Vcc through resistors and the respective keys are connected in the form of a matrix between the output ports P1 to P5 and the input ports P6 to P9, levels at the input ports P6, P7, P8 and P9 indicate respectively L, H, H and H in such timing that a low level L is set at the output port P1, for example, when the key 0 of the key matrix 90 is pressed.

S5 Each bit value 1/0 of the data read in the step S4 is inverted. Namely, the complement is obtained for each bit.

S6 The key reading data obtained in the step S5 is compared with the numeral 0. If the data equals to 0, this indicates the absence of keying input, so that the flow is forwarded to the step S13. In other cases, it is forwarded to the step S7.

S7 The key reading data is saved (or stored) in the predetermined memory.

S8 In order to avoid an influence of mechanical vibrations of key contacts, i.e., chuttering, it waits a predetermined period of time (e.g., 10 msec) enough for such vibrations being fully attenuated.

S9 Levels at the ports P6 to P9 are read once again.

S10 The logical sum of the value read in the step S9 and the value saved into the memory in the step S7 is calculated for each bit.

S11 It is checked whether the calculated result in the step S10 is 0 or not. If the calculated value is not 0, this is judged as that there is no keying input and hence the flow is forwarded to the step S13. Otherwise, it is forwarded to the step S12.

S12 A key code of 8 bits corresponding to the pressed keys is generated based on the bits of data "0" in the key rading rank signal data issued to the output ports P1 to P5 and the data read from the ports P6 to P9.

S13 The bits of data "0" in the key reading rank signal data issued to the output ports P1 to P5 are shifted to the adjacent bits, respectively.

S14 It is checked whether one cycle of key reading scan is completed or not. If the scan is not yet completed, the flow returns to the step S3 and the subsequent processing.

S15 Since there occurs no keying input, an 8-bit code 00H (hexadecimal notation) is set as a key code.

S16 The key code obtained at the time of previous key reading scan is loaded from the memory.

S17 The logical sum of the previous key code loaded in the step S16 and the new key code obtained by the present key reading scan is calculated for each bit.

S18 It is checked whether the calculated result is 0 or not. If it is 0, i.e., if there is no key operation, the flow returns to the step S2. In other cases, the flow comes into the step S19.

S19 Newly generated key code is stored in the memory at the predetermined address.

S20 It is checked whether the key code belongs to the key group A or not.

S21 It is checked whether the keys are pushed or pulled. In order that the keys in the group A, i.e., numeral keys, * key, # key, clear key CLR, repeat key RE and the hold key HOLD, are made effective only when they are pushed, the flow jumps to the step S2 when the keys are pulled.

S22 For confirmation of keying input, the buzzer is buzzed one time.

S23 It is checked whether the pushed keys belong to the group B or not. The keys of the group B, i.e., horn keys HS1 and HS2, are made effective in both cases they are pushed and pulled.

S24 The data of the generated key code is sent out to the transmission path to inform the apparatus on the vehicle body side of the presence of keying input. This processing will be described later in more detail.

S25 It is checked whether the data has been sent out correctly or not in the data transmission of the step S24.

S26 It is checked whether the pushed keys belong to the group C or not. As to the key of the group C, i.e., call-off key CALL/OFF, the data representing the inverted ON/OFF state of the key is transmitted every when the key is pushed.

S27 The data indicating the present ON/OFF state of the call-off key CALL/OFF is loaded from the memory.

S28 A new key code corresponding to the inverted ON/OFF state of the call-off key CALL/OFF is produced based on the key code and the data loaded in the step S27. For example, when the call-off key has been turned on in the previous operation, the present keying operation produces the key code data indicating the off state of the call-off key.

S29 Similar to the step S24.

S30 It is checked whether the data has been sent out correctly in the data transmission of the step S29.

S31 The content of the memory storing the ON/OFF state of the call-off key CALL/OFF is inverted.

S32 In accordance with the state of the call-off key CALL/OFF, the relay RL1 connected to the output port P15 of the microcomputer 80 undergoes ON/OFF control. Upon this, the FM modulation circuit 95 and other parts are controlled.

S33 Since there occurs an error in data transmission, the buzzer BZ is buzzed two times to inform the driver of error occurrence.

S34 Since there occurs an error in key reading, the buzzer is buzzed three times to inform the driver of error occurrence.

Figure 10B:
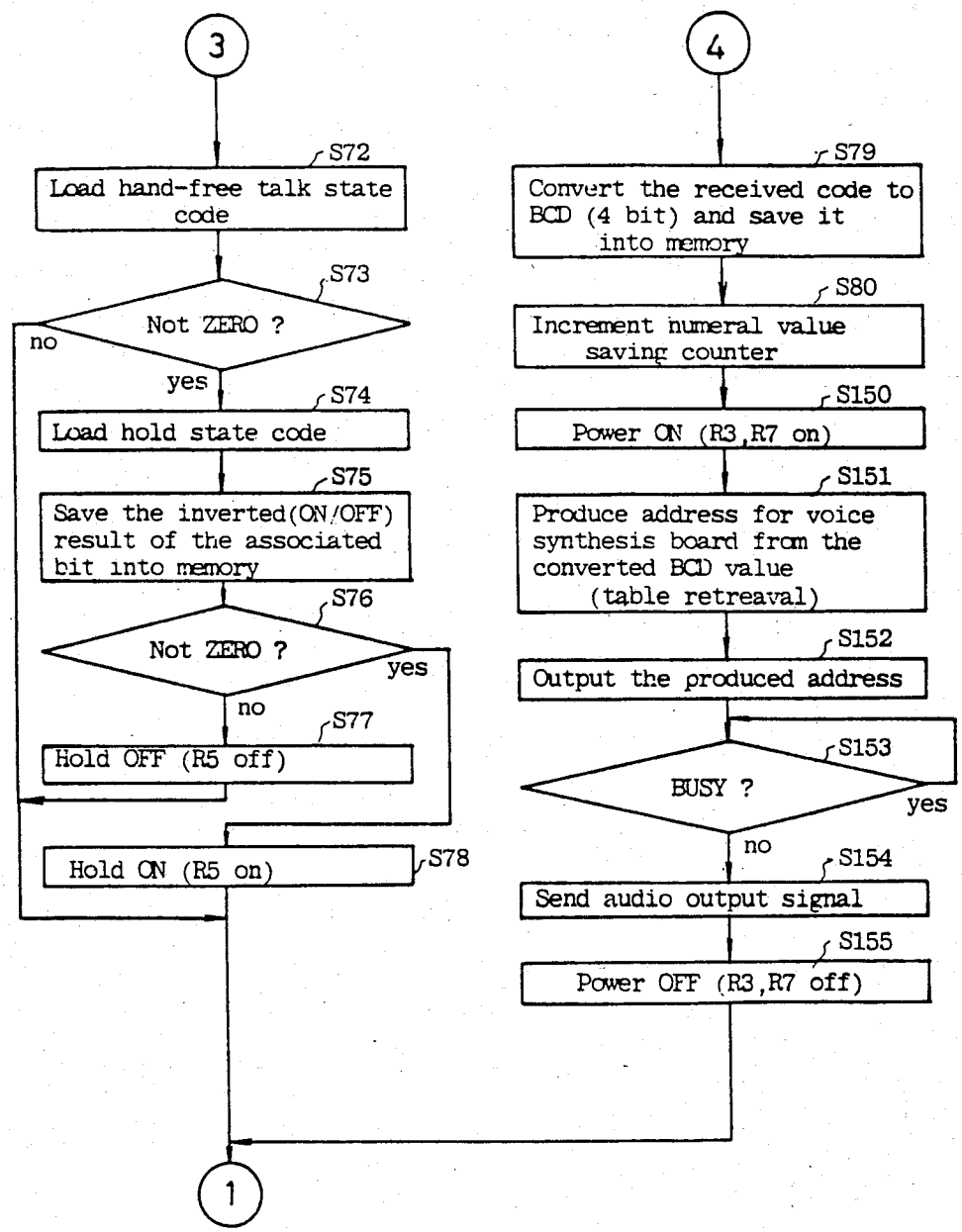
Figure 10C:
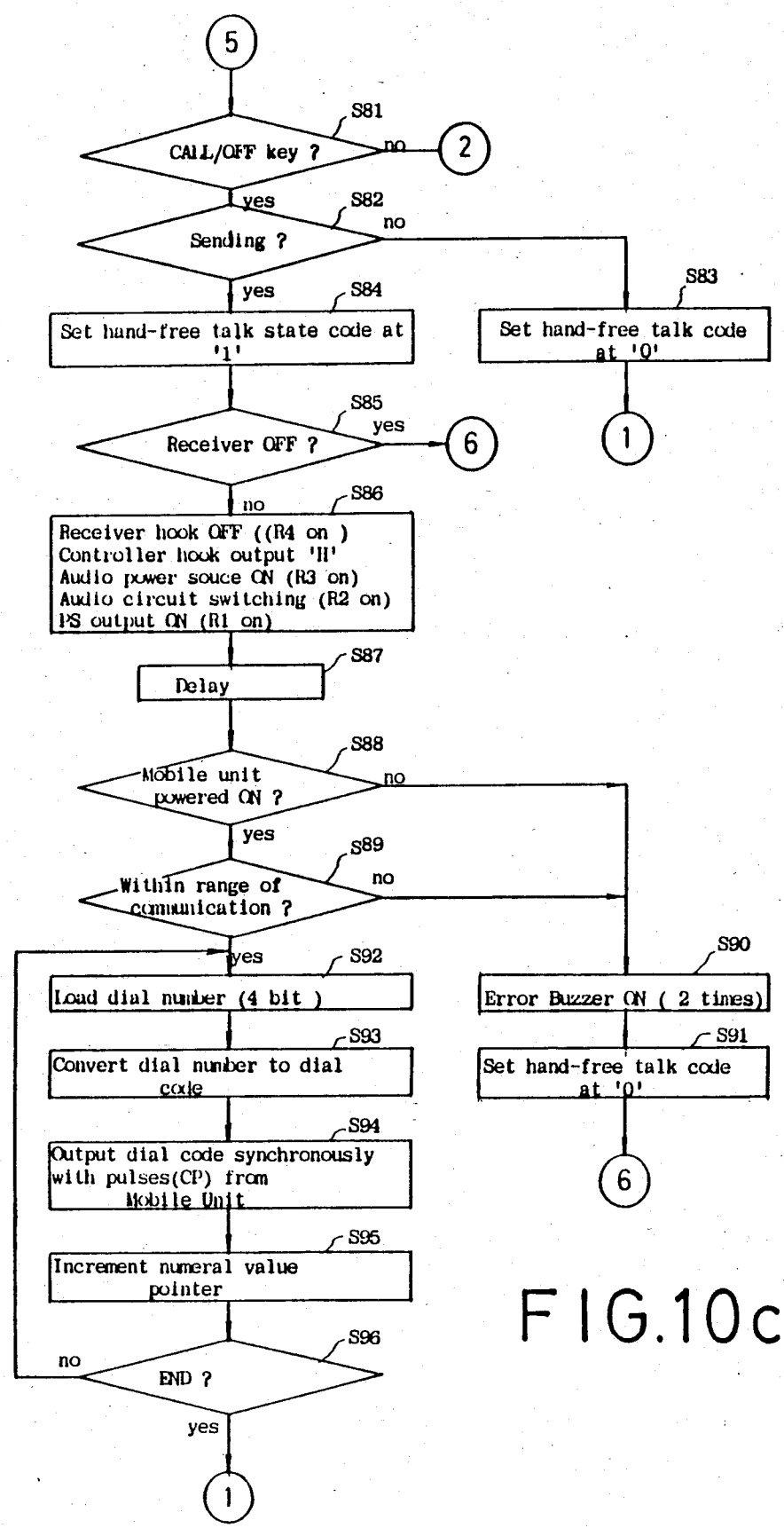

FIGS. 10a, 10b and 10c show operation of the apparatus on the vehicle body as shown in FIGS. 4a, 4b and 4c. Its operation steps will be now described in order by referring to FIGS. 10a, 10b and 10c.

S25 The content of the memory is initialized and the state of each output port of the microcomputer 130 is set at the initial level. With this processing, the output port P12 assumes a low level L, so that output of the FSK signal is inhibited.

S52 It is checked whether the receiver of the telephone set TEL is off or not.

S53 Since the receiver of the telephone set TEL is off, a high level H is issued at the output port HK20 to turn the relay R4 ON, H is issued at the output port HK10, and a low level L is issued at the output port Audio thereby to set the relays R2 and R3 (RL2) OFF. Upon this, the telephone set TEL becomes usable to be operated in the same manner as that of the normal road-vehicle telephone set.

S54 The content of the memory storing the command of hand-free talk from the steering wheel operation board is loaded.

S55 It is checked whether there exists the command of hand-free talk or not. In the initial state, the flow is forwarded to the step S57 because a hand-free talk is not commanded. But, when the call-off key CALL/OFF on the steering wheel operation board is set ON (CALL), it is forwarded to the step S56 by the presence of the command of hand-free talk.

S56 A high level H is issued at the output port HK20 to turn the relay R4 ON, H is set at the output port HK10, H is set at the output port Audio to turn the relays R2 and R3 (RL2) ON, and a low level L is issued at the output port PS to turn the relay R1 ON. Upon this, both telephone unit TEL and the mobile unit TRX are powered-on, the power source of the FM demodulation circuit 170 is turned ON, and the amplifier AMP is connected to the voice receiving line of the mobile unit TRX.

S57 A low level L is issued at the output port HOLD to turn the relay R5 OFF, L is issued at the output port HK20 to turn the relay R4 OFF, L is set at the output port HK10, L is issued at the output port Audio to turn the relays R2 and R3 (RL2) OFF, and a high level H is issued at the output port PS to set the relay R1 OFF. Upon this, the power sources of the telephone set TEL, the mobile unit TRX and the FM modulation circuit 170 are turned OFF, and the telephone set TEL is connected to the mobile unit TRX.

S58 The data from the steering operation board is received. This will be described later in more detail.

S59 It is judged whether data transmission generated by keying operation on the steering operation board has come or not actually from the steering operation board.

S60 It is judged whether the transmitted data corresponds to the key code of the group A or not.

S61 It is judged whether the key code corresponds to the numeral keys, * key or # key or not.

S62 It is judged whether the key code corresponds to the hold key HOLD or not.

S63 It is judged whether the key code corresponds to the clear key CLR or not.

S64 The address counter of the memory for storing the key codes corresponding to the numeral keys which have been transmitted until that time, is cleared. Namely, the numeral keying inputs until that time are cancelled.

S65 It is judged whether the key code corresponds to the group B or not.

S66 It is judged whether the key code corresponds to the horn keys HS1 and HS2 or not.

S67 Does the key code correspond to key switch-on ?

S68 Since the horn key is pulled, the horn is set OFF.

S69 Since the horn key is pushed, the horn is set ON.

S70 It is checked whether the key code corresponds to the group C or not.

S71 Since the key code received as data does not correspond to any one of the groups A, B and C, this is processed as an error in data receiving and the buzzer BZ is buzzed three times.

S72 The content of the memory for storing the command of hand-free talk from the steering operation board is loaded.

S73 It is checked whether the data loaded in the step S72 commands a hand-free talk or not.

S74 The content of the memory for storing the command from the hold key HOLD is loaded.

S75 The data state of 1/0 (i.e., ON/OFF) loaded in the step S74 is inverted and then stored in the original memory. Thus, if there has been no hold command in advance, the predetermined bit of the data is set at "1", i.e., the hold-on command.

S76 It is checked whether there is the hold-on command or not.

S77 Since hold-off commanded, L is issued at the output port HOLD to set the relay R5 OFF. Upon this, the signal output terminal of the FM demodulation circuit 170 is connected to the sending voice input terminal T of the mobile unit TRX, whereby it becomes possible to make a talk through the microphones MC1 and MC2 on the steering wheel.

S78 Since hold-on is commanded, H is issued at the output port HOLD to set the relay R5 ON. Upon this, the output terminal of the FM demodulation circuit 170 is disconnected from the mobile unit TRX.

S79 Since the key code corresponding to the numeral keys has come, the code is converted to the BCD (Binary Coded Decimal) code in accordance with the numeral values of the pushed numeral keys and then stored in the memory at the predetermined address.

S80 The content of the counter specifying the memory address which stores the BCD code corresponding to the numeral keys therein is incremented.

S81 It is checked whether the key code coming from the steering operation board indicates operation of the call-off key CALL/OFF or not.

S82 It is judged whether the key code indicates the ON (CALL) state of the call-off key or not.

S83 Since the call-off key is set OFF, the content of the memory for storing the command of hand-free talk is set 0 (hand-free talk OFF).

S84 Since the call-off key is set CALL, the content of the memory for storing the command of hand-free talk is set "1" (hand-free talk ON).

S85  It is checked whether the receiver of the telephone set TEL is taken off or not.

S86  H is issued at the output port HK20 to turn the relay R4 ON, H is set at the output port HK10, H is issued at the output port Audio to turn both relays R2 and R3 (RL2) ON, and L is issued at the output port PS to set the relay R1 ON. Upon this, the power sources of both telephone set TEL and mobile unit TRX are turned ON, the power source of the FM demodulation circuit 170 is turned ON, and the amplifier AMP is connected to the voice receiving line of the mobile unit TRX.

S87  It waits for a given time allowing actuation of the relays as well as allowing the mobile unit to come into the predetermined operation state from power-on.

S88  It is checked whether the mobile unit TRX is powered-on or not.

S89  It is checked whether the vehicle locates in an area permitting communication or not (i.e., whether the transmitted wave can reach the other party or not). This is judged by checking whether the output terminal CI of TRX indicates a call enable level or not.

S90  Since there occurs any trouble or the vehicle locates in an area disabling communication, the buzzer BZ is buzzed two times to inform the driver of error occurrence.

S91  The content of the memory for storing the command of hand-free talk is set "0" (hand-free talk off).

S92  The content of the memory for storing the 4-bit BCD code corresponding to the numeral values input by the numeral keys is read out from the address specified by the numeral pointer (address counter) and then loaded in the predetermined register.

S93  The BCD code obtained in the step S92 is converted into the same code as the dial code produced by the telephone set TEL.

S94  The dial code obtained in the step S93 is output to the DI terminal sequentially in synchronous relation with a pulse signal issued from the CP terminal of the mobile unit TRX.

S95  The value of the numeral pointer is incremented.

S96  It is checked whether all of the BCD codes are completely read out of the memory or not. This is judged by checking the value of the numeral pointer. If not completed, the flow returns to the step S92 to read out the BCD code from the next numeral pointer.

Figure 11A:
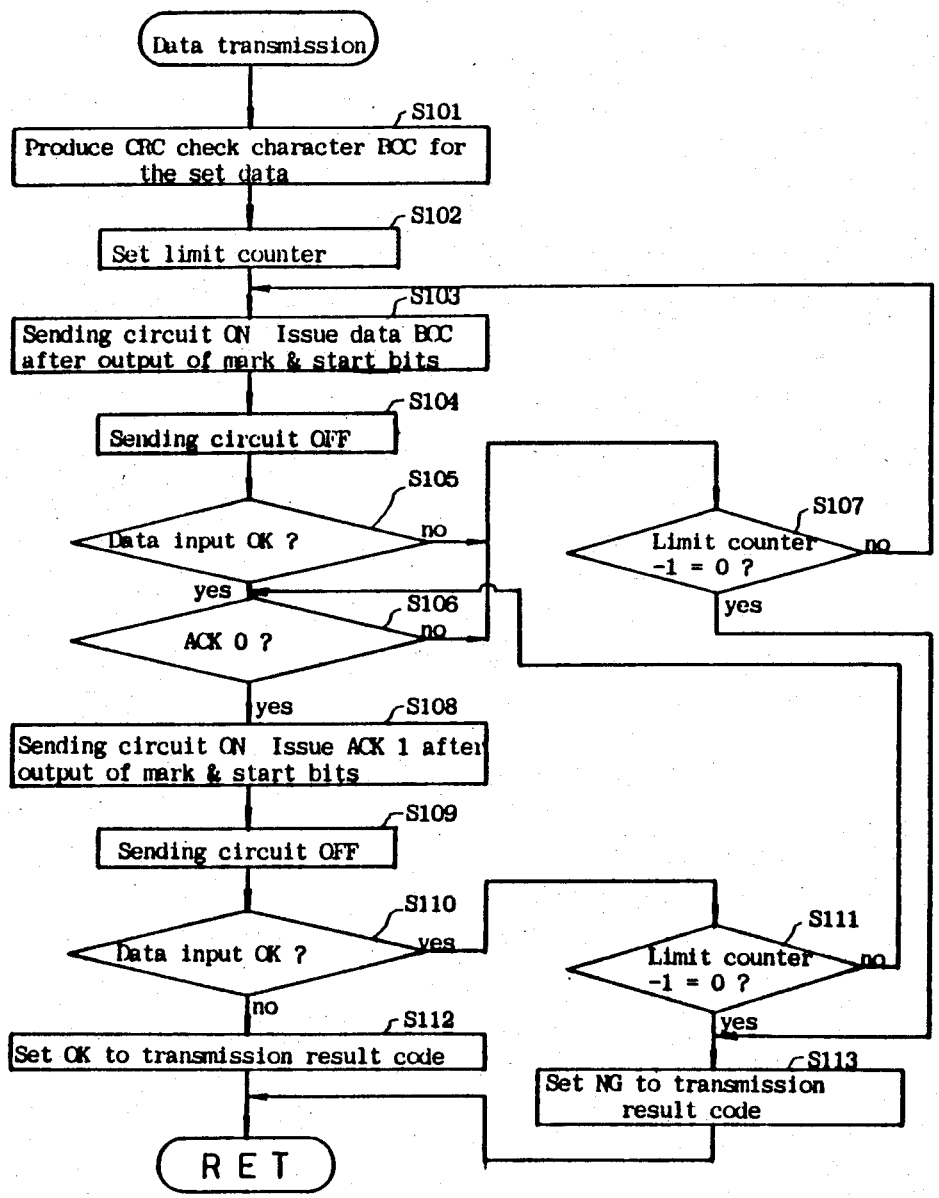
FIG. 11a is a flow chart showing the data transmitting (sending) operation of the microcomputer 80 in FIG. 1.

FIG. 11a shows data transmission (sending) operation of the microcomputer 80 in detail. Its operation steps will be now described in order by referring to FIG. 11a.

S101  An 8-bit CRC check character BCC is produced in accordance with the data to be transmitted.

S102  A limit counter adapted to limit the number of data transmissions is set at a predetermined value.

S103  The output port P12 is set at H to permit output of the FSK signal. The respective bit data comprising the mark signal, start bit, transmitted data and the BCC code are set at the output port P11 in synchronous relation with the clocks.

S104  L is set at the output port P12 to inhibit output of the FSK signal.

S105  It is checked whether there is data input from the FSK modulation circuit on the other party side. If there is no data input, the flow is forwarded to the step S107.

S106  It is checked whether the data sent from the other party is an acknowledgement ACK0 indicating data receipt confirmation or not. As described later, upon receipt of the data the receiving side outputs ACK0 to the sending side.

S107  The value of the limit counter is decremented, and it is checked whether the resultant value is 0 or not. If not 0, the flow returns to S103, while if 0, it comes into S113.

S108  H is set at the output port P12 once again to permit output of the FSK signal. Then, the respective bit data comprising the mark signal, start bit and the acknowledgment ACK1 indicating confirmation of ACK0 are output sequentially in synchronous relation with the clocks.

S109  L is set at the output port P12 to inhibit output of the FSK signal.

S110  It is checked whether the FSK signal has arrived from the other party (receiving side) or not. As described later, the receiving side stops to output the FSK signal upon receiving an acknowledgment ACK1 from the sending side after dispatch of the acknowledgment ACK0. But, receiving no ACK1, the other party outputs the FSK signal including ACK0 once again. Acccrdingly, arrival of the FSK signal from the receiving side means herein that the data ACK1 from the sending side has not yet been received by the receiving side.

S111  Since the data ACK1 has not yet been received by the receiving side, the value of the limit counter is decremented and then it is checked whether the resultant value is 0 or not. If not 0, the flow is returned to the step S106 to transmit the data ACK1 once again, while if 0, it comes into the step S113.

S112  Since the data transmission has been completed within the predetermined number of times set in the limit counter, "OK" is set to the transmission result code.

S113  Although the data transmission has been performed in the predetermined number of times set in the limit counter, both data and acknowledgment ACK1 are not transmitted correctly. Thus, "NG" is set to the transmission result code.

Figure 11B:
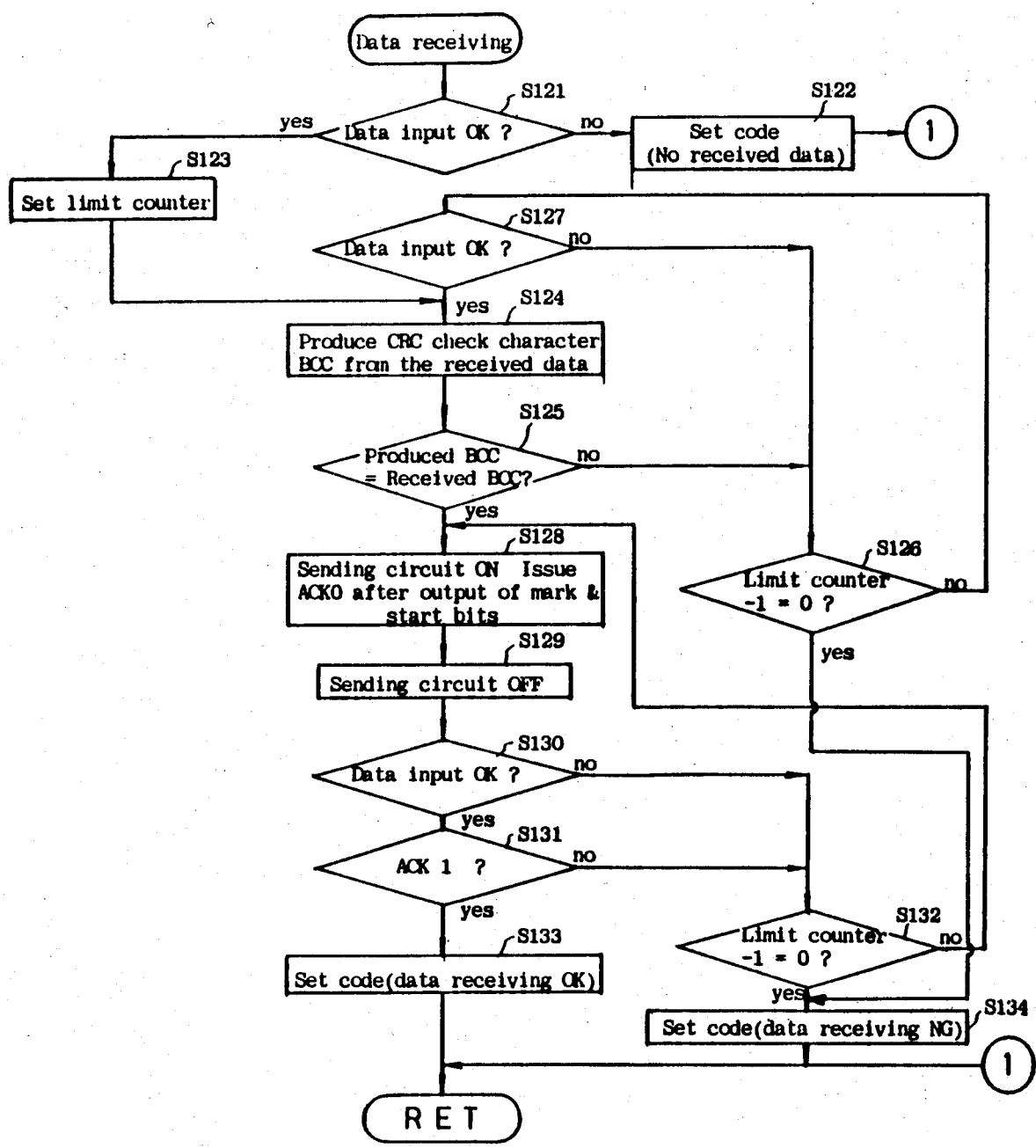
FIG. 11b is a flow chart showing the data receiving operation of the microcomputer 130 in FIG. 1.

FIG. 11b shows data receiving operation of the microcomputer 130 in detail. Its operation steps will be now described by referring to FIG. 11b.

S121  It is checked whether the FSK signal has been received or not, i.e., whether the data has arrived at the input port P13 or not.

S122  Since no data has arrived at the input port P13, the code corresponding to no data receipt is set in the data receiving memory.

S123  A predetermined value is set in the limit counter adapted to limit the number of data receiving operations in data transmission at one time.

S124  The CRC check character BCC is produced from the received data.

S125  Both BCC values produced from the received data and in the step S124 are compared with each other. If both values are equal, this is judged as that the data has been received correctly, and then the flow is forwarded to the step S128. Otherwise, it is forwarded to the step S126.

S126  Since there occurred an error, the limit counter is decremented and it is checked whether the resultant value is 0 or not. If not 0, the flow is returned to S127, while if 0, it comes into S134.

S127  It is checked whether there exists data input or not. If there exists the received data, the flow is forwarded to S124. Otherwise, it is forwarded to S126.

S128 Since the data has been received correctly, H is set at the output port P12 to permit output of the FSK signal. The respective bit data comprising the mark signal, start bit and the acknowledgment ACK0 are output sequentially in synchronous relation with the clocks.

S129 L is set at the output port P12 to inhibit output of the FSK signal.

S130 It is checked whether the FSK signal has been received on the receiving side.

S131 It is checked whether the received data is or not the acknowledgment ACK1 from the sending side to be dispatched in response to the acknowledgment ACK0 from the receiving side. If it is ACK1, the flow is forwarded to S133. Otherwise, it is forwarded to S132.

S132 The content of the limit counter is decremented, and then it is checked whether the resultant value is 0 or not. If not 0, the flow is returned to S128, while if 0, it comes into S134.

S133 Since the data transmission has been completed within the predetermined number of times set in the limit counter, "OK" is set to the transmission result code.

S134 Although the data transmission has been performed in the predetermined number of times set in the limit counter, both data and acknowledgment ACK1 are not transmitted correctly. Thus, "NG" is set to the transmission result code.

Hereinabove, although there has been described one embodiment by way of example wherein a telephone set is loaded on the vehicle, this invention is also applicable likewise to such cases of loading a wireless installation for use in business, amateur or CB communication on vehicles. Further, although the steering operation board of the above-mentioned embodiment includes no special indicators other than the buzzer, various indications may be achieved on the steering operation board by providing, for example, light emitting diode displays thereon.

Moreover, the road-vehicle battery is connected to the power line of the steering operation board via the slip rings in the foregoing embodiment, but it may be arranged as an alternative that the road-vehicle battery is connected to the power line of the steering operation board through an electromagnetic coupling using an electric coil, or that a small-sized battery is incorporated in the steering operation board to dispense with the power line connecting the board and the road-vehicle battery in case power consumption of the steering board is small.

According to this invention, as fully described in the above, since telephone or other communications can be effected using the microphones mounted on the steering wheel, it becomes possible for the driver to safely make communication even while driving the vehicle with no need of undesirable one-handed driving.

Having now fully set forth both structure and operation of preferred embodiment of the concept underlying the present invention, various other embodiments as well as certain variations and modifications of the embodiment herein shown and described will obviously occur to those skilled in the art upon becoming familiar with the underlying concept. It is to be understood, therefore, that with the scope of the appended claims, the invention may be practiced otherwise than as specifically set forth herein.

What we claimed is:

1. A signal transmission apparatus for a steering operation board comprising:

a steering operation board composed of at least one acoustic-electric conversion means, a first modulation means adapted to modulate a signal from said acoustic-electric conversion means, an input key switch means, and a second modulation means adapted to modulate a signal in accordance with operation of said switch means, said operation board being equipped on or near a steering wheel;

a road-vehicle control unit composed of a first demodulation means adapted to demodulate a signal modulated by said first modulation means, a second demodulation means adapted to demodulate a signal modulated by said second modulation means, a radio signal transmission means for emitting an electromagnetic wave modulated with an audio signal, a second acoustic-electric conversion means, a connection switching means adapted to selectively apply a signal from said first demodulation means and a signal from said second acoustic-electric conversion means to said radio signal transmission means, and a switching control means adapted to control said connection switching means in accordance with a signal from said second demodulation means, said control unit being equipped at a fixed position on the vehicle body mechanically separated from said steering operation board; and a light signal transmission means composed of a light emitting means adapted to convert an electric signal from said steering operation board to a light beam, and a light receiving means adapted to receive the light beam from said light emitting means and then apply an electric signal in accordance with the intensity of the light beam to said road-vehicle control unit.

2. A signal transmission apparatus for a steering operation board according to claim 1, wherein said light emitting means includes at least two light emitting elements disposed outside of a mounting position of spokes for supporting said steering wheel so that all these elements do not enter in the projected areas of said spokes simultaneously, and said light receiving means includes at least two light receiving elements disposed facing said light emitting elements.

3. A signal transmission apparatus for a steering operation board according to claim 1, wherein a power line of said steering operation board is connected to a road-vehicle battery through slip rings and brushes in contact with said slip rings.

4. A signal transmission apparatus for a steering operation board according to claim 1, wherein said second acoustic-electric conversion means is a telephone set.

5. A signal transmission apparatus for a steering operation board according to claim 1, wherein said first acoustic-electric conversion means comprises two microphones aligned in the same direction and differential amplifier means connected to said microphones and said first modulation means.

6. A signal transmission apparatus for a steering operation board according to claim 1, said first modulation means being a frequency modulation circuit and said second modulation means being an FSK modulation circuit.

7. A signal transmission apparatus for a steering operation board according to claim 1, said steering operation board including a third demodulation means and said road-vehicle control unit including a third modulation means.

8. A signal transmission apparatus for a steering operation board according to claim 1 further comprising a vehicle body supporting said steering operation board said body being provided with a first gear for rotatably supporting a steering means having a steering wheel connected thereto said steering operation board is provided with a second gear rotatably supported by said steering means, and a member connected to said steering means being provided with interconnected third and fourth gears respectively engaging with said first and second gears.

9. A signal transmission apparatus for a steering operation board according to claim 8, wherein said first and second gears have the same number of teeth, and said third and fourth have the same number of teeth.

10. A signal transmission apparatus for a steering operation board according to claim 8, wherein said third and fourth gears are fixed to both ends of a rotatable shaft supported by and extending on opposite sides of said steering wheel.

11. A signal transmission apparatus for a steering operation board comprising:
- a steering operation board composed of at least one acoustic-electric conversion means, a first modulation means adapted to modulate a signal from said acoustic-electric conversion means, an input key switch means, a second modulation means adapted to modulate a signal in accordance with operation of said switch means, and a first demodulation means, said operation board being equipped on or near a steering wheel;
- a road-vehicle control unit composed of a second demodulation means adapted to demodulate a signal modulated by said first modulation means, a third demodulation means adapted to demodulate a signal modulated by said second modulation means, a third modulation means adapted to send a signal to said first demodulation means, a radio signal transmission means for emitting an electromagnetic wave modulated with an audio signal, a telephone set, a connection switching means adapted to selectively apply a signal from said second demodulation means and a signal from said telephone set to said radio signal transmission means, and a switching control means adapted to control said connection switching means in accordance with a signal from said third demodulation means, said control unit being equipped at a fixed position on the vehicle body mechanically separated from said steering operation board;
- a light signal transmission means composed of at least two light emitting elements adapted to convert an electric signal from said steering operation board to light beams and disposed outside of a mounting position of spokes for supporting said steering wheel so that all these elements do not enter in the projected areas of said spokes simultaneously, and at least two light receiving elements disposed respectively facing said light emitting elements to receive the light beams therefrom and then apply an electric signal in accordance with the intensity of the light beams to said road-vehicle control unit; and
- a power transmission means composed of slip rings and brushes in contact with said slip rings through which a road-vehicle battery is connected to a power line of said steering operation board.

12. A signal transmission apparatus for a steering operation board according to claim 11, wherein said first acoustic-electric conversion means comprises two microphones aligned in the same direction and differential amplifier means connected to said microphones and said first modulation means.

* * * * *